US012198302B2

(12) United States Patent
Duan et al.

(10) Patent No.: US 12,198,302 B2
(45) Date of Patent: Jan. 14, 2025

(54) IMAGE PROCESSING METHOD AND DEVICE, AND TRAINING METHOD OF IMAGE PROCESSING MODEL AND TRAINING METHOD THEREOF

(71) Applicant: BOE TECHNOLOGY GROUP CO., LTD., Beijing (CN)

(72) Inventors: Ran Duan, Beijing (CN); Hanwen Liu, Beijing (CN); Yunhua Lu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/775,340

(22) PCT Filed: Jul. 15, 2021

(86) PCT No.: PCT/CN2021/106585
§ 371 (c)(1),
(2) Date: May 9, 2022

(87) PCT Pub. No.: WO2023/283894
PCT Pub. Date: Jan. 19, 2023

(65) Prior Publication Data
US 2024/0153038 A1 May 9, 2024

(51) Int. Cl.
*G06T 15/00* (2011.01)
*G06T 3/40* (2006.01)
(Continued)

(52) U.S. Cl.
CPC ............. *G06T 5/50* (2013.01); *G06T 3/40* (2013.01); *G06T 7/194* (2017.01); *G06T 11/60* (2013.01);
(Continued)

(58) Field of Classification Search
CPC . G06F 18/214; G06T 5/50; G06T 7/20; G06T 7/194; G06T 2207/20221;
(Continued)

(56) References Cited

U.S. PATENT DOCUMENTS 7,840,066 B1 * 11/2010 Chen ..................... G06T 5/90
382/254
8,682,097 B2 * 3/2014 Steinberg .............. G06T 5/77
382/275
(Continued)

FOREIGN PATENT DOCUMENTS

CN 109377501 A 2/2019
CN 109410211 A 3/2019
(Continued)

OTHER PUBLICATIONS

Xu H, Ma J, Jiang J, Guo X, Ling H. U2Fusion: A unified unsupervised image fusion network. IEEE Transactions on Pattern Analysis and Machine Intelligence. Jul. 28, 2020;44(1):502-18.*
(Continued)

*Primary Examiner* — Phu K Nguyen
(74) *Attorney, Agent, or Firm* — Dority & Manning, P.A.

(57) ABSTRACT

An image processing method includes: acquiring a first image containing a target object; inputting the first image into an image processing model to obtain a second image, the second image being a mask image of the target object in the first image, a value for each pixel in the second image being in a range of 0 to 1, inclusive ([0, 1]), and the range of 0 to 1, inclusive ([0, 1]) indicating a degree of relation between each pixel in the second image and a pixel in the target object; fusing the first image and a background image according to the second image to obtain a fused image; and providing a first interface and displaying the fused image on the first interface.

19 Claims, 9 Drawing Sheets

(51) Int. Cl.
 *G06T 5/50* (2006.01)
 *G06T 7/194* (2017.01)
 *G06T 11/60* (2006.01)
 *G06V 10/46* (2022.01)
(52) U.S. Cl.
 CPC .. *G06V 10/462* (2022.01); *G06T 2207/20221* (2013.01)
(58) Field of Classification Search
 CPC . G06T 2207/30204; G06T 2207/30201; G06T 2207/10004; G06V 40/168
 USPC .......................................................... 345/418
 See application file for complete search history.

(56) References Cited

U.S. PATENT DOCUMENTS

| | | | | |
|---|---|---|---|---|
| 9,405,773 | B2* | 8/2016 | Chittar | G06F 16/532 |
| 9,519,972 | B2* | 12/2016 | Venkataraman | G06T 1/20 |
| 9,525,858 | B2* | 12/2016 | Schwarz | G06T 7/529 |
| 10,147,216 | B1 | 12/2018 | Miao et al. | |
| 10,492,981 | B1* | 12/2019 | Kumar | A61H 19/44 |
| 11,875,510 | B2* | 1/2024 | Wang | G06T 3/4046 |
| 11,922,638 | B2* | 3/2024 | Cao | G06N 3/088 |
| 11,937,524 | B2* | 3/2024 | Sibley | A01B 69/001 |
| 2017/0148223 | A1* | 5/2017 | Holzer | G06V 20/10 |
| 2018/0068473 | A1 | 3/2018 | Tico et al. | |
| 2022/0245391 | A1* | 8/2022 | Badjatiya | G06F 18/253 |
| 2024/0078680 | A1* | 3/2024 | Zheng | G06V 10/267 |

FOREIGN PATENT DOCUMENTS

| | | | | |
|---|---|---|---|---|
| CN | 109583509 | A | 4/2019 | |
| CN | 109614983 | A | 4/2019 | |
| CN | 111260548 | * | 6/2020 | ............ G06N 3/045 |
| CN | 111260548 | A | 6/2020 | |
| CN | 111260679 | * | 6/2020 | .............. G06T 5/50 |
| CN | 111260679 | A | 6/2020 | |
| CN | 111401247 | A | 7/2020 | |
| CN | 111652796 | A | 9/2020 | |
| CN | 111768356 | * | 10/2020 | .............. G06T 5/50 |
| CN | 111768356 | A | 10/2020 | |
| CN | 112053366 | A | 12/2020 | |
| CN | 112258528 | A | 1/2021 | |
| CN | 112702641 | * | 4/2021 | ....... H04N 21/47205 |
| CN | 112702641 | A | 4/2021 | |
| JP | 2000261774 | A | 9/2000 | |

OTHER PUBLICATIONS

Qin et al., "U2-Net: Going Deeper with Nested U-Structure for Salient Object Detection", Pattern Recognition, vol. 106, Oct. 2020, 107404, 15 pages.

Zhou Hongli, "Research on Pixel-Level Image Segmentation Based on Generative Adversarial Network" (w/English translation of abstract), Xidian University, Master in Electronics and Communications Engineering, Jun. 2019, 85 pages.

* cited by examiner

IMAGE PROCESSING METHOD AND DEVICE, AND TRAINING METHOD OF IMAGE PROCESSING MODEL AND TRAINING METHOD THEREOF

CROSS-REFERENCE TO RELATED APPLICATION

This application is a national phase entry under 35 USC 371 of International Patent Application No. PCT/CN2021/106585 filed on Jul. 15, 2021, which is incorporated herein by reference in its entirety.

TECHNICAL FIELD

The present disclosure relates to the field of image processing technologies, and in particular, to an image processing method and an image processing device, and a training method of an image processing model and a training device thereof.

BACKGROUND

In the post-processing of a photo, it is a common way for processing an image to replace the background of a person in the photo, which may extract a figure of the person in the photo and replace a messy or monotonous background with a beautiful or rich background, thereby enhancing the aesthetic of the photo.

SUMMARY

In an aspect, an image processing method is provided. The image processing method includes: acquiring a first image containing a target object; inputting the first image into an image processing model to obtain a second image, the second image being a mask image of the target object in the first image, a value for each pixel in the second image being in a range of 0 to 1, inclusive ([0, 1]), and the range of 0 to 1, inclusive ([0, 1]) indicating a degree of relation between each pixel in the second image and a pixel in the target object; fusing the first image and a background image according to the second image to obtain a fused image; and providing a first interface and displaying the fused image on the first interface.

In some embodiments, acquiring the first image containing the target object includes: providing a second interface displaying a user input indication; receiving a first instruction input by a user; and acquiring the first image containing the target object in response to the first instruction.

In some embodiments, after displaying the fused image on the first interface, the image processing method further includes: receiving a second instruction input by the user; and displaying the second interface in response to the second instruction.

In some embodiments, after displaying the fused image on the first interface, the image processing method further includes: receiving a third instruction input by a user; and editing the fused image displayed on the first interface by using one or more image editing manners in response to the third instruction.

In some embodiments, the fused image, the first image, the second image, and the background image satisfy a following relationship: $I_{fusion} = T_{fusion1}[T_{fusion2} \times I_{person} \times I_{mask} + T_{fusion3} \times I_{background} \times (1 - I_{mask})]$; where $I_{fusion}$ represents the fused image, $I_{person}$ represents the first image, $I_{background}$ represents the background image, $I_{mask}$ represents the second image, a value of each element of $I_{mask}$ is in a range of 0 to 1, inclusive ([0, 1]), and $T_{fusion1}$, $T_{fusion2}$ and $T_{fusion3}$ each represent an image processing function.

In some embodiments, the image processing method further includes: acquiring computing resource information of a computing device for performing the image processing method; and adjusting image processing resolution of the image processing model according to the computing resource information.

In some embodiments, the target object is a person figure, and the image processing model is an image processing model trained by using following steps: inputting a portrait with simple background, an image with complex background and a portrait with complex background into a pre-trained image processing model; determining an error function of the pre-trained image processing model; and training the pre-trained image processing model according to the error function to obtain the image processing model. A truth-value image of the portrait with simple background and a truth-value image of the portrait with complex background are both a mask image of the portrait with simple background, and a truth-value image of the image with complex background is an all-zero image.

In some embodiments, the portrait with complex background is a composite image of the portrait with simple background and the image with complex background. Before inputting the portrait with simple background, the image with complex background and the portrait with complex background into the pre-trained image processing model, the following steps used to train the image processing model further includes: fusing the portrait with simple background and the image with complex background according to the mask image of the portrait with simple background to obtain another fused image; and performing augmentation processing on the another fused image to obtain the portrait with complex background.

In some embodiments, the portrait with complex background, the portrait with simple background, and the image with complex background satisfy a following relationship: $I_{fusion}' = T_{random1}[T_{random2} \times I_{person}' \times I_{mask}' + T_{random3} \times I_{background}' \times (1 - I_{mask}')]$; where $I_{fusion}'$ represents the portrait with complex background, $I_{person}'$ represents the portrait with simple background, $I_{background}'$ represents the image with complex background, $I_{mask}'$ represents the mask image of the portrait with simple background, a value of each element of $I_{mask}'$ is in a range of 0 to 1, inclusive ([0, 1]), and $T_{random1}$, $T_{random2}$ and $T_{random3}$ each represent a random image processing function.

In some embodiments, the pre-trained image processing model includes a salient object detection model. The mask image of the portrait with simple background includes a saliency probability map output by the salient object detection model after the portrait with simple background is input into the salient object detection model.

In some embodiments, the pre-trained image processing model is a first $U^2$-Net model. The mask image of the portrait with simple background is a saliency probability map output by a second $U^2$-Net model after the portrait with simple background is processed by using the second $U^2$-Net model.

In some embodiments, determining the error function of the pre-trained image processing model includes: comparing an output image of the pre-trained image processing model with a corresponding truth-value image to obtain the error function.

In another aspect, a training method of an image processing model is provided. The training method of the image processing model includes: inputting a portrait with simple background, an image with complex background and a portrait with complex background into a pre-trained image processing model; determining an error function of the pre-trained image processing model; and training the pre-trained image processing model according to the error function to obtain the image processing model. A truth-value image of the portrait with simple background and a truth-value image of the portrait with complex background are both a mask image of the portrait with simple background, and a truth-value image of the image with complex background is an all-zero image.

In some embodiments, the portrait with complex background is a composite image of the portrait with simple background and the image with complex background. Before inputting the portrait with simple background, the image with complex background and the portrait with complex background into the pre-trained image processing model, the training method further includes: fusing the portrait with simple background and the image with complex background according to the mask image of the portrait with simple background to obtain a fused image; and performing augmentation processing on the fused image to obtain the portrait with complex background.

In some embodiments, the portrait with complex background, the portrait with simple background, and the image with complex background satisfy a following relationship: $I_{fusion}' = T_{random1}[T_{random2} \times I_{person}' \times I_{mask}' + T_{random3} \times I_{background}' \times (1 - I_{mask}')]$; where $I_{fusion}'$ represents the portrait with complex background, $I_{person}'$ represents the portrait with simple background, $I_{background}'$ represents the image with complex background, $I_{mask}'$ represents the mask image of the portrait with simple background, a value of each element of $I_{mask}'$ is in a range of 0 to 1, inclusive ([0, 1]), and $T_{random1}$, $T_{random2}$ and $T_{random3}$ each represent a random image processing function.

In some embodiments, the pre-trained image processing model includes a salient object detection model. The mask image of the portrait with simple background includes a saliency probability map output by the salient object detection model after the portrait with simple background is input into the salient object detection model.

In some embodiments, the pre-trained image processing model is a first $U^2$-Net model. The mask image of the portrait with simple background is a saliency probability map output by a second $U^2$-Net model after the portrait with simple background is processed by using the second $U^2$Net model.

In some embodiments, determining the error function of the pre-trained image processing model includes: comparing an output image of the pre-trained image processing model with a corresponding truth-value image to obtain the error function.

In yet another aspect, an image processing device is provided. The image processing device includes at least one processor, an image processing model, and at least one non-transitory computer-readable storage medium including instructions. The instructions, when executed by the at least one processor, cause the at least one processor to perform operations. The operations include: acquiring a first image containing a target object; inputting the first image into the image processing model to obtain a second image, the second image being a mask image of the target object in the first image, a value for each pixel in the second image being in a range of 0 to 1, inclusive ([0, 1]), and the range of 0 to 1, inclusive ([0, 1]) indicating a degree of relation between each pixel in the second image and a pixel in the target object; fusing the first image and a background image according to the second image to obtain a fused image; and providing a first interface and displaying the fused image on the first interface.

In yet another aspect, an image processing device is provided. The image processing device includes a memory and a processor The memory has stored thereon one or more computer programs. The processor is coupled to the memory, and the processor is configured to execute the one or more computer program to implement the image processing method as described in any of the above embodiments.

In yet another aspect, a training device of an image processing model is provided. The training device of the image processing model includes at least one processor, a pre-trained image processing model, and at least one non-transitory computer-readable storage medium including instructions. The instructions, when executed by the at least one processor, cause the at least one processor to perform operations. The operations include: inputting a portrait with simple background, an image with complex background and a portrait with complex background into the pre-trained image processing model; determining an error function of the pre-trained image processing model; and training the pre-trained image processing model according to the error function model to obtain the image processing model. A truth-value image of the portrait with simple background and a truth-value image of the portrait with complex background are both a mask image of the portrait with simple background, and a truth-value image of the image with complex background is an all-zero image.

In yet another aspect, a training device of an image processing model is provided. The training device of the image processing model includes a memory and a processor. The memory having stored thereon one or more computer programs. The processor is coupled to the memory, and the processor is configured to execute the one or more computer programs to implement the training method of the image processing model as described in any of the above embodiments.

In yet another aspect, an electronic apparatus is provided. The electronic apparatus includes the image processing device as described in any of the above embodiments, and a display device. The display device is configured to display interfaces.

In yet another aspect, an image processing system is provided. The image processing system includes the image processing device as described in any of the above embodiments, the training device of the image processing model as described in any of the above embodiments, and a display device. The display device is configured to display interfaces.

In yet another aspect, a computer-readable storage medium is provided. The computer-readable storage medium has stored thereon computer program instructions that, when run on a processor, cause the processor to perform one or more steps of the image processing method as described in any of the above embodiments, or one or more steps of the training method of the image processing model as described in any of the above embodiments.

In yet another aspect, a computer program product is provided. The computer program product includes computer program instructions that, when executed by a computer, cause the computer to perform one or more steps of the image processing method as described in any of the above embodiments, or one or more steps of the training method of the image processing model as described in any of the above embodiments.

In yet another aspect, a computer program is provided. When the computer program is executed by a computer, the computer program causes the computer to perform one or more steps of the image processing method as described in any of the above embodiments, or one or more steps of the training method of the image processing model as described in any of the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these accompanying drawings. In addition, the accompanying drawings to be described below may be regarded as schematic diagrams, and are not limitations on actual sizes of products, actual processes of methods and actual timings of signals involved in the embodiments of the present disclosure.

DETAILED DESCRIPTION

Figure 1:
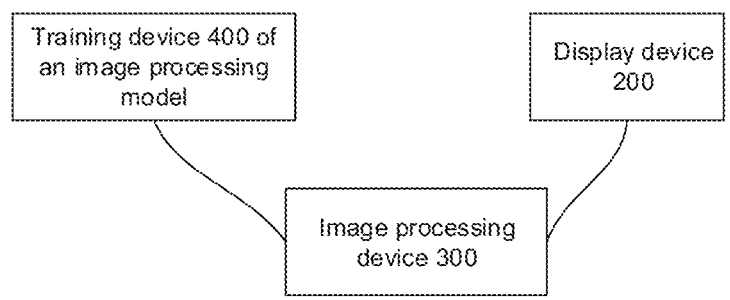
FIG. 1 is a structural diagram of an image processing system, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, features defined by "first" or "second" may explicitly or implicitly include one or more of the features. In the description of the embodiments of the present disclosure, the term "a plurality of" or "the plurality of" means two or more unless otherwise specified.

In the description of some embodiments, the expressions "coupled" and "connected" and their extensions may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. The term "coupled" or "communicatively coupled", however, may also mean that two or more components are not in direct contact with each other, but still cooperate or interact with each other. The embodiments disclosed herein are not necessarily limited to the content herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining that" or "in response to detecting", depending on the context. Similarly, depending on the context, the phrase "if it is determined that" or "if [a stated condition or event] is detected" is optionally construed as "in a case where it is determined that", "in response to determining that", "in a case where [the stated condition or event] is detected", or "in response to detecting [the stated condition or event]".

The use of the phase "applicable to" or "configured to" herein means an open and inclusive language, which does not exclude devices that are applicable to or configured to perform additional tasks or steps.

In addition, the use of the phrase "based on" or "according to" is meant to be open and inclusive, since a process, step, calculation or other action that is "based on" or "according to" one or more of the stated conditions or values may, in practice, be based on or according to additional conditions or values exceeding those stated.

In the post-processing of a photo, it is a common way for processing an image to perform portrait segmentation to replace a background of the photo. However, segmentation precision and accuracy of applications that may realize one-key intelligent matting currently on the market cannot meet the requirements, which usually requires the user to manually refine the details of the cutout, and is too cumbersome.

The embodiments of the present disclosure provide an image processing system. As shown in FIG. 1, the image processing system 100 includes an image processing device 300, a display device 200 and a training device 400 of an image processing model. The image processing device 300 is coupled to the display device 200 and the training device 400 of the image processing model. For example, the display device 200 and the image processing device 300 may be connected in communication, and the image processing device 300 and the training device 400 of the image processing model may also be connected in communication. For example, the image processing device 300 may control an image displayed on the display device 200, that is, display content on an interface of the display device 200. For example, the image processing device 300 may use an output of the training device 400 of the image processing model (i.e., an image processing model obtained by training) to perform image processing.

For example, the display device and the training device of the image processing model may establish a connection with the image processing device through a wireless communication mode (e.g., Wi-Fi and Bluetooth). For example, the image processing device is connected with a wireless router or a wireless access point (AP) through a wireless communication mode or a wired communication mode, the display device and the training device of the image processing model are connected with the wireless access point (AP) through a wireless communication mode, and are further connected with the image processing device in communication. Of course, the communication connection mode is not limited thereto in the embodiments. For example, the image processing device 300 may establish connections with the display device and the training device of the image processing model through a wired communication mode.

The image processing device 300 is configured to implement an image processing method as described in any of the following embodiments. For example, the image processing device 300 may acquire a first image containing a target object; input the first image into an image processing model to obtain a second image, the second image being a mask image of the target object in the first image, a value for each pixel in the second image being in a range of 0 to 1, inclusive (i.e., [0, 1]), and the range of 0 to 1, inclusive ([0, 1]) indicating a degree of relation between each pixel in the second image and a pixel in the target object; fuse the first image and a background image according to the second image to obtain a fused image; and provide a first interface and display the fused image on the first interface.

The training device 400 of the image processing model is configured to implement a training method of an image processing model as described in any of the following embodiments. For example, the training device 400 of the image processing model may input a portrait with simple background, an image with complex background and a portrait with complex background into a pre-trained image processing model, determine an error function of the pre-trained image processing model, and train the pre-trained image processing model according to the error function, so as to obtain the image processing model. A truth-value image of the portrait with simple background and a truth-value image of the portrait with complex background are each a mask image of the portrait with simple background, and a truth-value image of the image with complex background is an all-zero image.

In some embodiments, the display device is configured to display images. For example, the display device may display processing results of the image processing device. For example, the display device may be a display, or a product including a display, such as a television, a computer (an all-in-one machine or a desktop computer), a tablet computer, a mobile phone, or an electronic picture screen. For example, the display device may be any device that displays images whether in motion (e.g., a video) or stationary (e.g., a still image), and regardless of text or image. More specifically, it is anticipated that the described embodiments may be applied to or associated with a variety of electronic devices, and the variety of electronic devices include (but are not limited to), for example, game consoles, television monitors, flat panel displays, computer monitors, automotive displays (e.g., odometer displays), navigators, cockpit controllers and/or displays, electronic photos, electronic billboards or signs, projectors, architectural structures, packaging and aesthetic structures (e.g., a display for an image of a piece of jewelry).

For example, the display device described herein may include one or more displays, or one or more terminals with display functions. Therefore, the image processing device may send processed data (e.g., the fused image) to the display device, and then the display device displays the processed data. That is to say, a full interaction (controlling and receiving results) between a user and the image processing system may be realized through the interface (i.e., a user interactive interface) of the display device 200.

The display device is configured to display interfaces. For example, the interfaces include various interfaces described herein, such as a first interface and a second interface. For example, the display device may display the processing results for the images processed by the image processing device.

Figure 2:
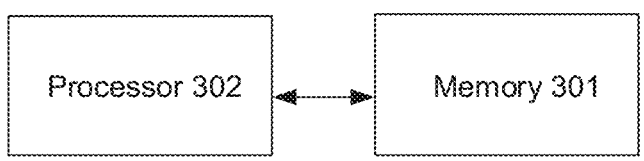
FIG. 2 is a structural diagram of an image processing device, in accordance with some embodiments.

In some embodiments, as shown in FIG. 2, the image processing device 300 includes a memory 301 and a processor 302. The memory 301 is coupled to the processor 302. For example, the processor is coupled to the memory through an input/output (I/O) interface, thereby realizing information interaction.

The memory 301 has stored therein one or more computer programs that can be run on the processor 302.

The computer program(s), when executed by the processor 302, cause the image processing device 300 to implement the image processing method described in any of the following embodiments.

For example, the processor 302 may be a single processor, or may be a collective name of a plurality of processing elements. For example, the processor 302 may be a general-purpose central processing unit (CPU), a microprocessor, an application specific integrated circuit (ASIC), or one or more integrated circuits used for controlling the execution of programs of solutions of the present disclosure, such as one or more microprocessors. For another example, the processor 302 may be a programmable device, such as a complex programmable logic device (CPLD), an erasable programmable logic device (EPLD) or a field programmable gate array (FPGA).

The memory 301 may be a single memory, or may be a collective name of a plurality of storage elements. The memory 301 is used to store executable program codes and the like. Moreover, the memory 301 may include a random access memory or a non-volatile memory, such as a disk memory or a flash memory.

The memory 301 is used to store application program codes for implementing the solutions of the present disclosure, and the execution of the application program codes is controlled by the processor 302. The processor 302 is used to execute the application program codes stored in the memory 301, so as to control the image processing device 300 to implement the image processing method provided in any of the following embodiments of the present disclosure.

Figure 3:
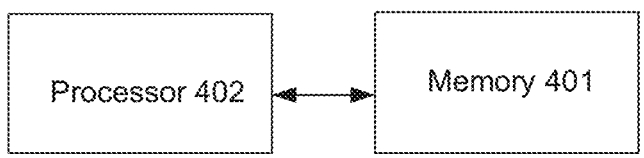
FIG. 3 is a structural diagram of a training device of an image processing model, in accordance with some embodiments.

In some embodiments, as shown in FIG. 3, the training device 400 of the image processing model includes a memory 401 and a processor 402. The memory 401 is coupled to the processor 402. For example, the processor is coupled to the memory through an input/output (I/O) interface, thereby realizing information interaction.

The memory 401 has stored therein one or more computer programs that can be run on the processor 402.

The computer program(s), when executed by the processor 402, cause the training device 400 of the image processing model to implement the training method of the image processing model described in any of the following embodiments.

For example, the processor 402 may be a single processor, or may be a collective name of a plurality of processing elements. For example, the processor 402 may be a general-purpose central processing unit (CPU), a microprocessor, an application specific integrated circuit (ASIC), or one or more integrated circuits used for controlling the execution of programs of solutions of the present disclosure, such as one or more microprocessors. For another example, the processor 402 may be a programmable device, such as a complex programmable logic device (CPLD), an erasable programmable logic device (EPLD) or a field programmable gate array (FPGA).

The memory 401 may be a single memory, or may be a collective name of a plurality of storage elements. The memory 401 is used to store executable program codes and the like. Moreover, the memory 401 may include a random access memory or a non-volatile memory, such as a disk memory or a flash memory.

The memory 401 is used to store application program codes for implementing the solutions of the present disclosure, and the execution of the application program codes is controlled by the processor 402. The processor 402 is used to execute the application program codes stored in the memory 401, so as to control the training device 400 of the image processing model to implement the training method of the image processing model provided in any of the following embodiments of the present disclosure.

Figure 4:
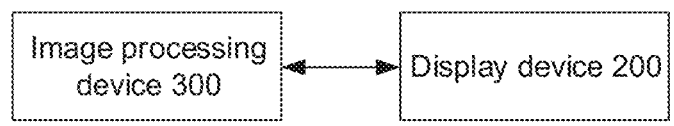
FIG. 4 is a structural diagram of an electronic apparatus, in accordance with some embodiments.

The embodiments of the present disclosure provide an electronic apparatus. For example, the electronic apparatus may be a computer. As shown in FIG. 4, the electronic apparatus 500 includes an image processing device 300 and a display device 200. The display device 200 is coupled to the image processing device 300.

The image processing device 300 is configured to implement the image processing method described in any of the following embodiments. For example, the image processing device 300 may include a personal computer, a portable electronic device, a cloud server, or other electronic devices with computing functions. The display device 200 is configured to display interfaces. For example, the display device 200 is configured to display processing results of the image processing device 300.

It will be noted that, the image processing device and the display device in the electronic apparatus are respectively similar to the image processing device and display device in the image processing system. As for specific content of the image processing device and the display device in the electronic apparatus, reference may be made to the above description, which will not be repeated herein.

Figure 5:
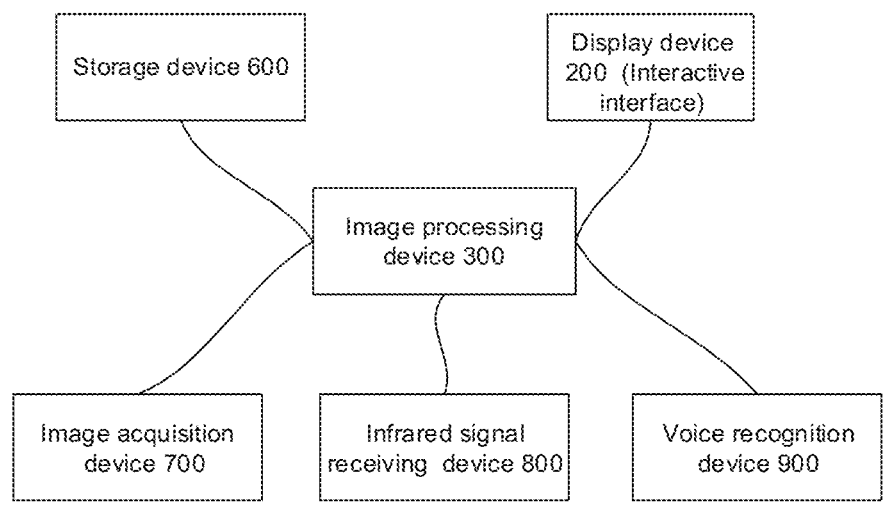
FIG. 5 is a structural diagram of another electronic apparatus, in accordance with some embodiments.

In some embodiments, as shown in FIG. 5, the electronic apparatus 500 further includes a storage device 600, an image acquisition device 700, an infrared signal receiving device 800 and a voice recognition device 900. For example, the storage device 600, the image acquisition device 700, the infrared signal receiving device 800 and the voice recognition device 900 are all coupled to the image processing device 300.

The storage device 600 is configured to store data. For example, the data stored in the storage device includes a user's album, and the image processing device may obtain a historical photo in the storage device 600, perform image processing on the photo, and control the display device 200 to display a processing result for the historical photo on an interface.

The image acquisition device 700 is configured to acquire images. For example, the image acquisition device acquires a real-time image of the user according to an instruction of the image processing device, so that the image is processed, and the display device is controlled to display a processing result of the real-time image on an interface. For another example, the image processing device recognizes the user's gesture instruction and performs a corresponding operation according to an image sequence including the gesture photographed by the image acquisition device 700.

The infrared signal receiving device 800 is configured to receive infrared signal(s). For example, the image processing device recognizes the user's key instruction and performs a corresponding operation according to an infrared signal sent by an external infrared remote control and received by the infrared signal receiving device 800.

The voice recognition device 900 is configured to receive voice signals. For example, the image processing device recognizes the user's voice instruction and performs a corresponding operation according to a voice signal received by the voice recognition device.

The embodiments of the present disclosure provide an image processing method. For example, the image processing method may be applied to the image processing system, the electronic apparatus, and the image processing device.

Figure 6:
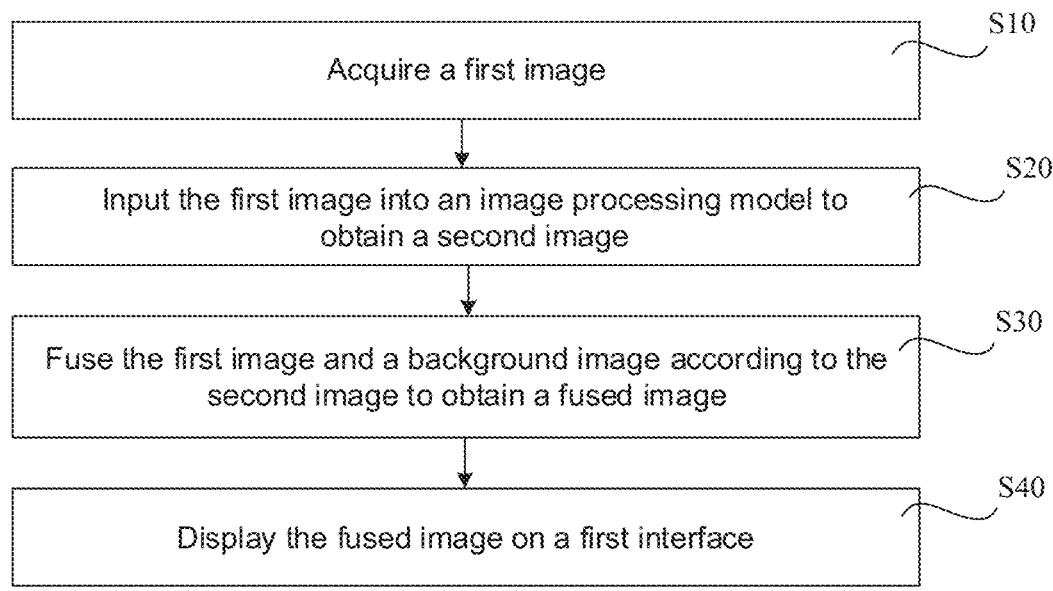
FIG. 6 is a flow diagram of an image processing method, in accordance with some embodiments.
Figure 7:
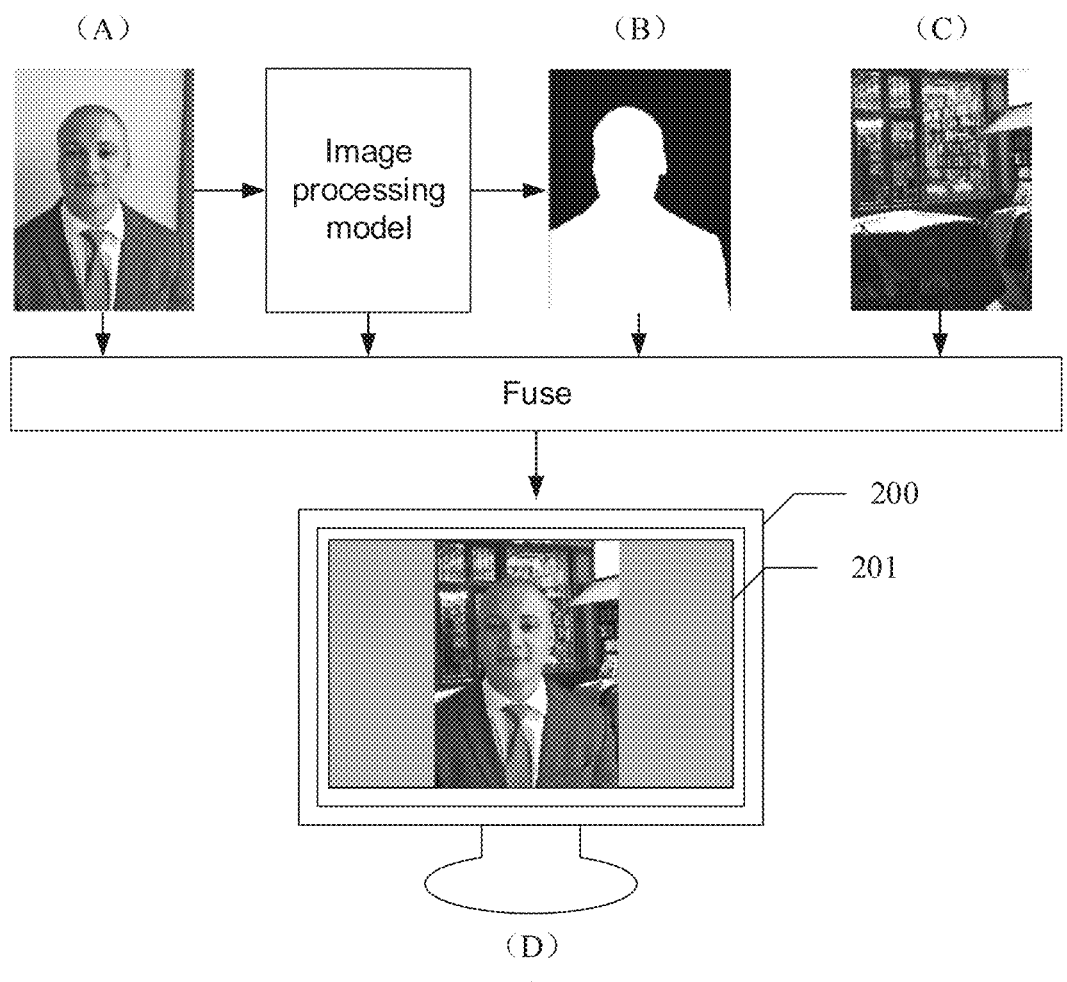
FIG. 7 is a schematic diagram of an image processing method, in accordance with some embodiments.

Referring to FIGS. 6 and 7, FIG. 6 is a flow diagram of an image processing method provided by the embodiments of the present disclosure, and FIG. 7 is a schematic diagram of an image processing method provided by the embodiments of the present disclosure. As shown in FIG. 6, the image processing method includes the following steps (S10 to S40).

In S10, a first image containing a target object is acquired.

For example, the target object contained in the first image may be person figure(s), other animal(s) or other object(s). The first image may be shown with reference to the portion (A) in FIG. 7.

For example, the first image may be a photo taken by the user, or may be a photo selected by the user from an album.

For example, the first image may be a portrait with simple background or a portrait with complex background, may be a half-length portrait or a full-length portrait, and may also be a single-person portrait or a multi-person portrait.

In some embodiments, acquiring the first image containing the target object includes: providing a second interface displaying a user input indication; receiving a first instruction input by the user; acquiring the first image containing the target object in response to the first instruction.

For example, the second interface may be a photographing interface or an album interface. For example, the first instruction input by the user includes a gesture instruction, a voice instruction, or an infrared remote control instruction.

In a case where the second interface is the photographing interface, the second interface includes a finder frame, which may preview images acquired by the image acquisition device in real time. For example, referring to FIG. 8A, the display device 200 displays the second interface 202 and receives the first instruction input by the user, the image processing device 300 takes a photo to acquire the first image containing the target object in response to the first instruction.

Figure 8A:
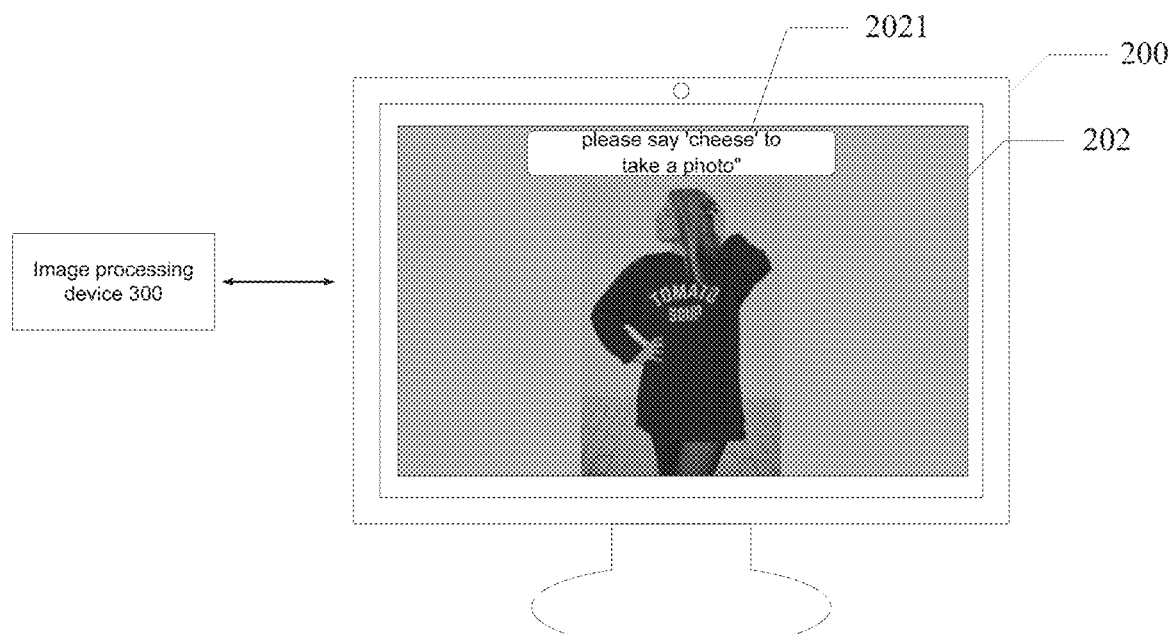
FIG. 8A is a process diagram of an image processing method, in accordance with some embodiments.
Figure 8B:
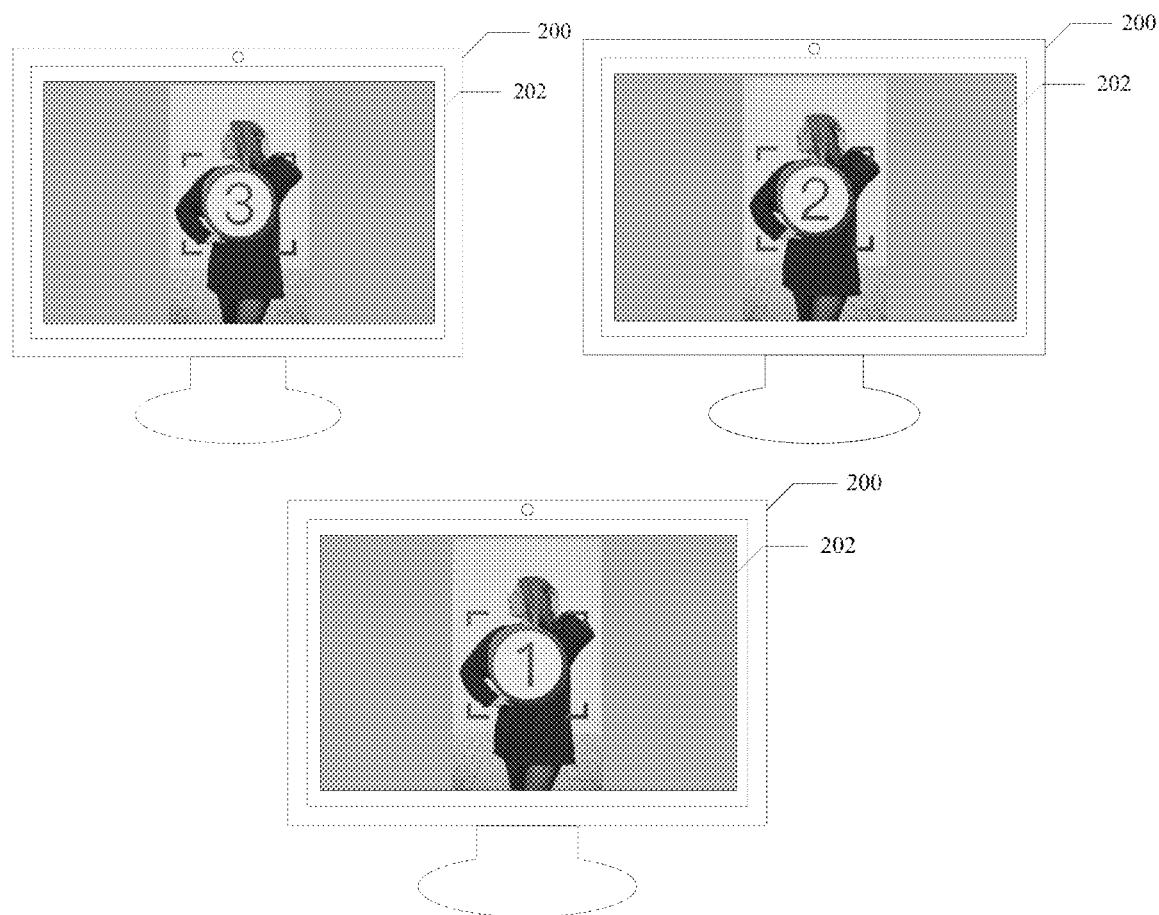
FIG. 8B is another process diagram of an image processing method, in accordance with some embodiments.

For example, referring to FIG. 8A, in a case where the first instruction is a voice instruction, a first prompt 2021 "please say 'cheese' to take a photo" may be displayed on the second interface 202. When the user inputs the voice instruction "cheese", referring to FIG. 8B, countdowns "3", "2" and "1" are displayed on the second interface 202 in sequence. After the countdowns end, the image processing device takes a photo to generate the first image containing, for example, a person figure according to an image acquired by the image acquisition device. Optionally, the voice instruction may also be another keyword such as "take a photo", and the first prompt displayed on the second interface may also be adjusted accordingly, which is not limited here.

Figure 8C:
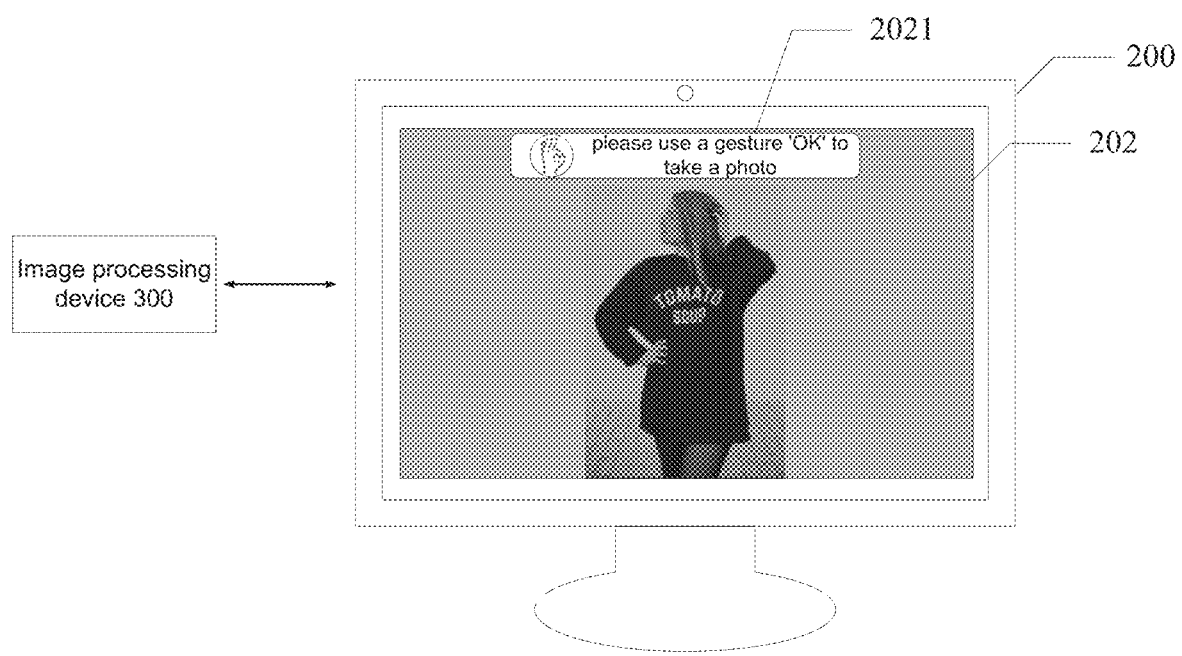
FIG. 8C is yet another process diagram of an image processing method, in accordance with some embodiments.

For example, referring to FIG. 8C, in a case where the first instruction is a gesture instruction, a first prompt 2021 "please use a gesture 'OK' to take a photo" may be displayed on the second interface 202. When the user inputs the gesture instruction "OK", the countdowns "3, 2", and "1" are displayed on the second interface 202 in sequence. After the countdowns end, the image processing device takes a photo to generate the first image containing, for example, the person figure according to the image acquired by the image acquisition device. Optionally, the gesture instruction may also be another common gesture such as "scissor-hand" gesture or "give a like" gesture (e.g., a gesture of thumb-up), and the first prompt displayed on the second interface may also be adjusted accordingly, which is not limited here.

Optionally, the user may also trigger by pressing a key. For example, the user uses a remote control and presses an "OK" key, and the countdowns "3", "2", "1" are displayed on the second interface 202. After the countdowns end, the image processing device takes a photo to generate the first image containing, for example, the person figure according to the image acquired by the image acquisition device. Optionally, the key used on the remote control for determining the photographing may also be another key such as a "photograph" key or a "confirm" key, which is not limited here.

In some other embodiments, the key may be a physical key or a virtual key on a touch screen, and the remote control may be an infrared emitting device with a physical key, or an electronic device with a touch screen and an infrared emitting function, which is not limited here.

It will be noted that, the voice instruction, the gesture instruction or the key instruction corresponding to the first instruction may be set in advance, and may also be customized by the user. After the user inputs the first instruction, the countdowns of the image processing device may be set in advance, and may also be customized by the user, alternatively, a photo is directly taken without the countdowns.

In a case where the second interface is the album interface, a list of historical photos is displayed on the second interface, and a frame of a pre-selected photo is bold. For example, referring to FIG. 9, the display device 200 displays the second interface 202 and receives the first instruction input by the user, and the image processing device 300 selects the first image containing, for example, the person figure in response to the first instruction.

Figure 9:
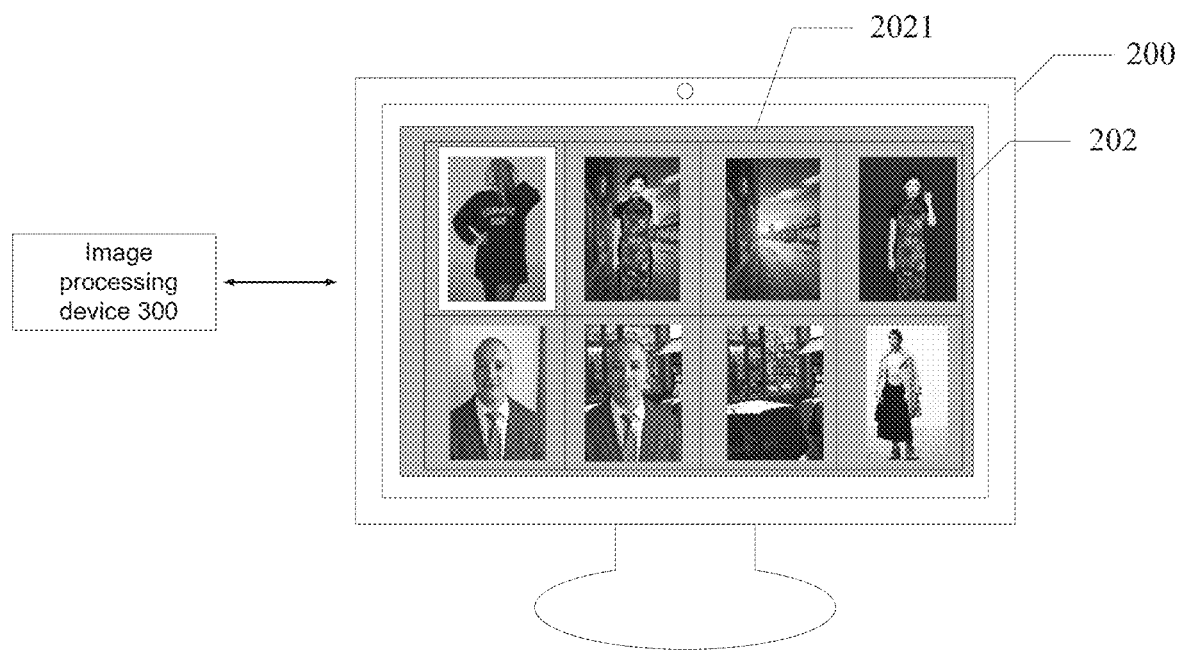
FIG. 9 is yet another process diagram of an image processing method, in accordance with some embodiments.

For example, referring to FIG. 9, in a case where the first instruction is a voice instruction, a list of historical photos is displayed on the second interface 202, and the pre-selected photo is a latest photo by default. The frame of the pre-selected photo is bold or highlighted. The user may input a voice instruction "up", "down", "left", or "right" to replace the pre-selected photo, and input a voice instruction "select" to select the first image, and the image processing device 300 acquires the first image from the storage device. Optionally, the voice instruction corresponding to the first instruction may also be a keyword such as "OK" or "confirm", which is not limited here.

For example, referring to FIG. 9, in a case where the first instruction is a gesture instruction, the list of historical photos is displayed on the second interface 202, and the pre-selected photo is the latest photo by default. The frame of the pre-selected photo is bold or highlighted. The user may input a gesture instruction "up", "down", "left", or "right" to replace the pre-selected photo, and input a gesture instruction "OK" to select the first image, and the image processing device 300 acquires the first image from the storage device. Optionally, the gesture instruction corresponding to the first instruction may also be another common gesture such as "scissor-hand" gesture or "give a like" gesture (e.g., a gesture of thumb-up), which is not limited here.

Optionally, the user may also trigger by a key. For example, the user uses a remote control presses "up", "down", "left", "right" or other keys to replace the pre-selected photo, and presses an "OK" key to select the first image, and the image processing device 300 acquires the first image from the storage device. Optionally, the key used on the remote control for selecting the first image may also be another common key such as a "select" key or a "confirm" key, which is not limited here.

In some other embodiments, the key may be a physical key or a virtual key on a touch screen, and the remote control may be an infrared emitting device with a physical key, or an electronic device with a touch screen and an infrared emitting function, which is not limited here.

In S20, the first image is input into an image processing model to obtain a second image.

For example, the second image may be a mask image of the target object in the first image. For example, in a case where the first image is a portrait, the second image is a mask image of a person figure in the first image. The second image may be shown with reference to the portion (B) in FIG. 7.

For example, a value for each pixel in the second image is in a range of 0 to 1, inclusive ([0, 1]), which reflects a probability that pixels in the first image are pixels of the person figure. The range of 0 to 1, inclusive ([0, 1]) indicates a degree of relation between each pixel in the second image and a pixel in the target object (e.g., the person figure). It will be understood that, corresponding to a region inside the person figure in the first image, the value for a pixel in the second image is 1; corresponding to a background region in the first image, the value for a pixel in the second image is 0; and corresponding to a boundary region between the person figure and the background, the value for a pixel in second image is in the range of 0 to 1, which indicates that the pixel in the boundary region may be a pixel of the person figure, a pixel of the background, or both. As presented in the second image, the boundary region has a certain transparency, rather than a generally clear boundary in which a value is either 0 or 1.

For example, the image processing model is a neural network model trained in advance. For example, the image processing model may be a salient object detection (SOD) model. The salient object detection model may be a $U^2$-Net model. The salient object detection model is used to distinguish a most attractive object in an image. During a training process, the salient object detection model is trained with a specific type of training set, and a target object segmentation model for a specific scene may be trained in a short time. For example, the salient object detection model is trained using a large number of half-length portraits, and an obtained image processing model has high efficiency and good segmentation effects on segmentation processing of half-length portraits. For another example, the salient object detection model is trained using a large number of portraits with complex background, and an obtained image processing model has high efficiency and good segmentation effects on segmentation processing of portraits with complex background.

In some other embodiments, in a case where the target object is a person figure, the image processing model may also be any of other neural network models for portrait segmentation, such as a deep convolutional neural network (DCNN) model for portrait segmentation inference, the DCNN model may perform a mask inference on the person figure in the first image, and a mask image output by the DCNN model is the second image.

In some embodiments, the first image is input into an image processing model that matches a type of the first image according to the type of the first image. For example, if the first image is a half-length portrait, a selected training sample set of the image processing model is a half-length portrait set, and the image processing model has an accurate segmentation effect on the half-length portrait. For another example, if the first image is a full-length portrait, a selected training sample set of the image processing model is a full-length portrait set, and the training sample set has an accurate segmentation effect on the full-length portrait.

In some embodiments, the first image is input into an image processing model that matches resolution of the first image according to the resolution of the first image. For example, if the resolution of the first image is very high, an image processing model with high image processing resolution is selected. For another example, if the resolution of the first image is much lower than resolution of an input image required by the image processing model (for example, in a case where interpolations are more than 100% of a size of the first image, the image will be distorted due to excessive interpolations), it is necessary to select an image processing model with low image processing resolution.

In some embodiments, the target object is the person figure, the image processing model is an image processing model trained by adopting the following steps: inputting a portrait with simple background, an image with complex background and a portrait with complex background into a pre-trained image processing model; determining an error function of the pre-trained image processing model; and training the pre-trained image processing model according to the error function, so as to obtain the image processing model. A truth-value image of the portrait with simple background and a truth-value image of the portrait with complex background are both a mask image of the portrait with simple background, and a truth-value image of the image with complex background is an all-zero image.

Figure 13:
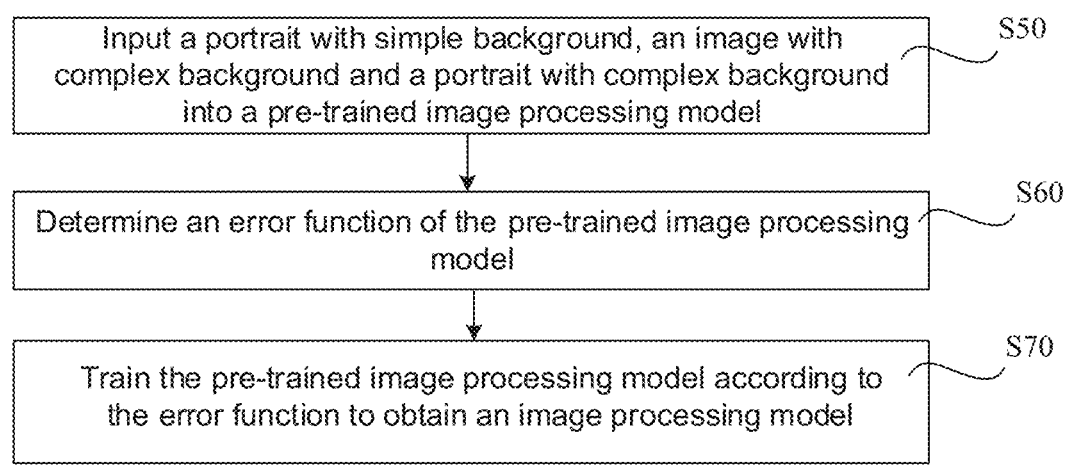
FIG. 13 is a flow diagram of a training method of an image processing model, in accordance with some embodiments.

It will be noted that, descriptions of the portrait with simple background, the image with complex background, the portrait with complex background, the pre-trained image processing model, and the error function may refer to descriptions in corresponding sections of a training method of the image processing model shown in FIG. 13 below, which will not be repeated here.

Therefore, in the embodiments of the present disclosure, the image processing model is a salient object detection model trained in advance, sample features of the training sample set include the portraits with simple background, the images with complex background and the portraits with complex background. The training sample set is used to train the salient object detection model, so that the error function is less than a preset error threshold, and the image processing model is obtained. In this way, the salient object detection model is trained using a portrait segmentation training sample set, a segmentation ability of the salient object detection model is transferred from "foreground-background" recognition to "portrait-background" recognition, and the training of a portrait segmentation model is quickly completed. Considering that a task of the salient object detection is to detect and label visually salient objects in images, while portrait segmentation is to limit categories of salient objects to a range of person(s) based on the task of the salient object detection, referring to features of transfer learning, network parameters are initialized by using a pre-trained image processing model of a salient object detection algorithm (e.g. $U^2$-Net), so that the network starts to optimize the parameters at a good node, which may realize a rapid convergence of a loss function, thereby reducing training time and enhancing stability of the network training.

For example, the portrait with complex background is a composite image of the portrait with simple background and the image with complex background. Before the portrait with simple background, the image with complex background and the portrait with complex background are input into the pre-trained image processing model, the following steps are further included: fusing the portrait with simple background and the image with complex background according to the mask image of the portrait with simple background to obtain a fused image; and performing augmentation processing on the fused image to obtain the portrait with complex background.

It will be noted that, a description for performing the augmentation processing on the fused image may refer to a description for image augmenting in a corresponding section of the training method of the image processing model shown in FIG. 13 below, which will not be repeated here.

For example, the portrait with complex background, the portrait with simple background, and the image with complex background satisfy a following relationship:

$$I_{fusion}' = T_{random1}[T_{random2} \times I_{person}' \times I_{mask}' + T_{random3} \times I_{background}' \times (1-I_{mask}')].$$

Where $I_{fusion}'$ represents the portrait with complex background, $I_{person}'$ represents the portrait with simple background, $I_{background}'$ represents the image with complex background, $I_{mask}'$ represents the mask image of the portrait with simple background, a value of each element of $I_{mask}'$ is in a range of 0 to 1, inclusive ([0, 1]), and $T_{random1}$, $T_{random2}$ and $T_{random3}$ each represent a random image processing function.

It will be noted that, a description of the random image processing function may refer to a description of a random image processing function in a corresponding section of the training method of the image processing model shown in FIG. 13 below, which will not be repeated here.

For example, the pre-trained image processing model includes the salient object detection model. The mask image of the portrait with simple background includes a saliency probability map output by the salient object detection model after the portrait with simple background is input into the salient object detection model.

For example, the pre-trained image processing model is a first $U^2$-Net model. The mask image of the portrait with simple background is a saliency probability map output by a second U-Net model after the portrait with simple background is processed by using the second $U^2$-Net model.

It will be noted that, descriptions of the salient object detection model and the $U^2$-Net model may refer to descriptions of the salient object detection model and the $U^2$-Net model in corresponding sections in the training method of the image processing model shown in FIG. 13 below, which will not be repeated here.

For example, determining the error function of the pre-trained image processing model includes: comparing an output image of the pre-trained image processing model with a corresponding truth-value image to obtain the error function.

Therefore, in the embodiments of the present disclosure, the portrait with complex background in the training sample set is the composite image of the portrait with simple background and the image with complex background. In the training sample set, a sample label of the portrait with simple background and a sample label of the portrait with complex background are both the mask image of the portrait with simple background, and a sample label of the image with complex background is the all-zero image. The mask image of the portrait with simple background is a salient object detection result of the portrait with simple background. In this way, raw data are portraits with simple background and the images with complex background, and a photo of a portrait with simple background is segmented by the salient object detection algorithm, so that a precise and accurate portrait segmentation result, as a data label of the training sample set, may be obtained quickly. Thus, labor cost and time cost of manual labeling may be avoided, which is simple and efficient. A portrait foreground obtained by segmentation and the images with complex background are fused randomly, and data augmentation are performed thereon in combination with traditional image processing methods, so that a large number of portraits with complex background and labeled data pairs are obtained, which may quickly complete an acquisition of a required training sample set, and ensure quality and quantity.

In S30, the first image and a background image are fused according to the second image to obtain a fused image.

For example, the background image may include various types of background images including indoor scenes, urban scenes, or natural scenery. The background image may be shown with reference to the portion (C) in FIG. 7.

For example, considering an example where the target object is the person figure and the second image obtained in S20 is the mask image of the person figure, the step of fusing the first image and the background image according to the second image may include the following steps.

1) Merging Images.

The first image and the background image are merged according to the mask image. The merged image satisfies a formula:

$$I_{fusion}'' = I_{person} \times I_{mask} + I_{background} \times (1-I_{mask}).$$

Where $I_{fusion}''$ represents the merged image, $I_{person}$ represents the first image, $I_{background}$ represents the background image, $I_{mask}$ represents the mask image (i.e., the second image), the value of each element of $I_{mask}$ is in a range of 0 to 1, inclusive ([0, 1]).

It can be understood that, the mask image is traversed pixel by pixel, a region of the person figure in the first image is captured, a collage of the region of the person figure with the background image is obtained, and the person figure covers an original figure in a corresponding region of the background image to obtain the merged image. Since corresponding to the boundary region between the person figure and the background in the first image, a value for the pixel in the mask image is in a range of 0 to 1, the boundary region has a certain transparency, rather than a generally clear boundary in which the value is either 0 or 1. Therefore, the merged image has a natural transition at an edge. For example, a value for a certain pixel at the boundary of the mask image is 0.3, and the merged image at this pixel is a combination of the person figure with a value of 0.3 and the background with a value of 0.7, so that the transition of the boundary is natural and not abrupt.

2) Fusing Images.

It can be understood that, brightness, saturation, sharpness, and the like of the first image and the background image may be inconsistent. One or more fusion processing operations of brightness adjustment, contrast adjustment, color adjustment, saturation adjustment, and Gaussian filtering are performed on the merged image, so as to generate the fused image of the first image and the background image.

For example, assuming that the brightness of the first image is 50 and the brightness of the background image is 100, brightness of the merged image is adjusted to 80, so that overall brightness of the fused image is uniform, and there is no obvious boundary and brightness difference between the person figure and the background.

It can be understood that, sizes of the first image and the background image may also be inconsistent, and a position of the person figure in the background image may also be inappropriate. Therefore, one or more of fusion processing operations of translation, scaling and rotation are performed on the merged image, so as to improve a visual effect of the fused image.

For example, a landmark building in the background image is at a left side of the image, the person figure is translated to a right side of the background image. For example, resolution of the background image is 1080×1920, and resolution of the first image is 1920×1080, the first image may be reduced to 1080×607.5, or the background image may be enlarged to 1920×3403.3, and a center of the first image is aligned with a center of the background image.

It can be understood that, one or more fusion processing operations of the brightness adjustment, contrast adjustment, color adjustment, saturation adjustment, Gaussian filtering, translation, scaling, or rotation may be achieved by integrally processing the merged image using corresponding image processing functions, or may be achieved by separately processing the first image or the background image using corresponding image processing functions.

In S40, a first interface is provided, and the fused image is displayed on the first interface.

For example, referring to the portion (D) in FIG. 7, the display device 200 displays the first interface 201.

In some embodiments, after the fused image is displayed on the first interface, the image processing method further includes: receiving a second instruction input by the user; and displaying a second interface in response to the second instruction.

For example, if the user is not satisfied with a currently generated fused image, the user inputs the second instruction to return to the photographing interface or the album interface, and re-photograph to generate a first image or re-select a first image.

In some embodiments, after the fused image is displayed on the first interface, the image processing method further includes: receiving a third instruction input by the user; and performing an image processing on the fused image displayed on the first interface in response to the third instruction using one or more image editing manners.

For example, if the user is not satisfied with the currently generated fused image, the user inputs the third instruction to further edit the fused image. Optionally, the one or more image editing manners include: Gaussian filtering processing, image exposure adjustment, image contrast adjustment, image saturation adjustment, image sharpness adjustment, image scaling, image rotation, or image translation.

In some embodiments, the fused image, the first image, the second image, and the background image satisfy a following relationship:

$$I_{fusion}=T_{fusion1}[T_{fusion2}\times I_{person}\times I_{mask}+T_{fusion3}\times I_{background}\times(1-I_{mask})].$$

Where $I_{fusion}$ represents the fused image, $I_{person}$ represents the first image, $I_{background}$ represents the background image, $I_{mask}$ represents the second image, the value of each element of $I_{mask}$ is in a range of 0 to 1, inclusive ([0,1]), and $T_{fusion1}$, $T_{fusion2}$, and $T_{fusion3}$ each represent an image processing function.

For example, $T_{fusion1}$ reflects an image fusion operation performed on a whole fused image in S30, and an image editing operation performed on the whole fused image by the user. $T_{fusion2}$ reflects an image fusion operation separately performed on the first image in S30, and an image editing operation separately performed on the first image by the user $T_{fusion3}$ reflects an image fusion operation separately performed on the background image in S30, and an image editing operation separately performed on the background image by the user.

In some embodiments, after the fused image is displayed on the first interface, the image processing method further includes: receiving a fourth instruction input by the user; and replacing a background image of the fused image in response to the fourth instruction.

For example, if the user is not satisfied with the currently generated fused image, the user inputs the fourth instruction to replace the background image of the fused image.

In some embodiments, after the fused image is displayed on the first interface, the image processing method further includes: receiving a fifth instruction input by the user; and storing or outputting the fused image in response to the fifth instruction.

For example, if the user is satisfied with the currently generated fused image, the user inputs the fifth instruction to store or output the fused image.

The following is an exemplary description of a subsequent processing of the fused image in the image processing method by considering an example in which the second instruction, the third instruction, the fourth instruction, and the fifth instruction are all gesture instructions.

Figure 10:
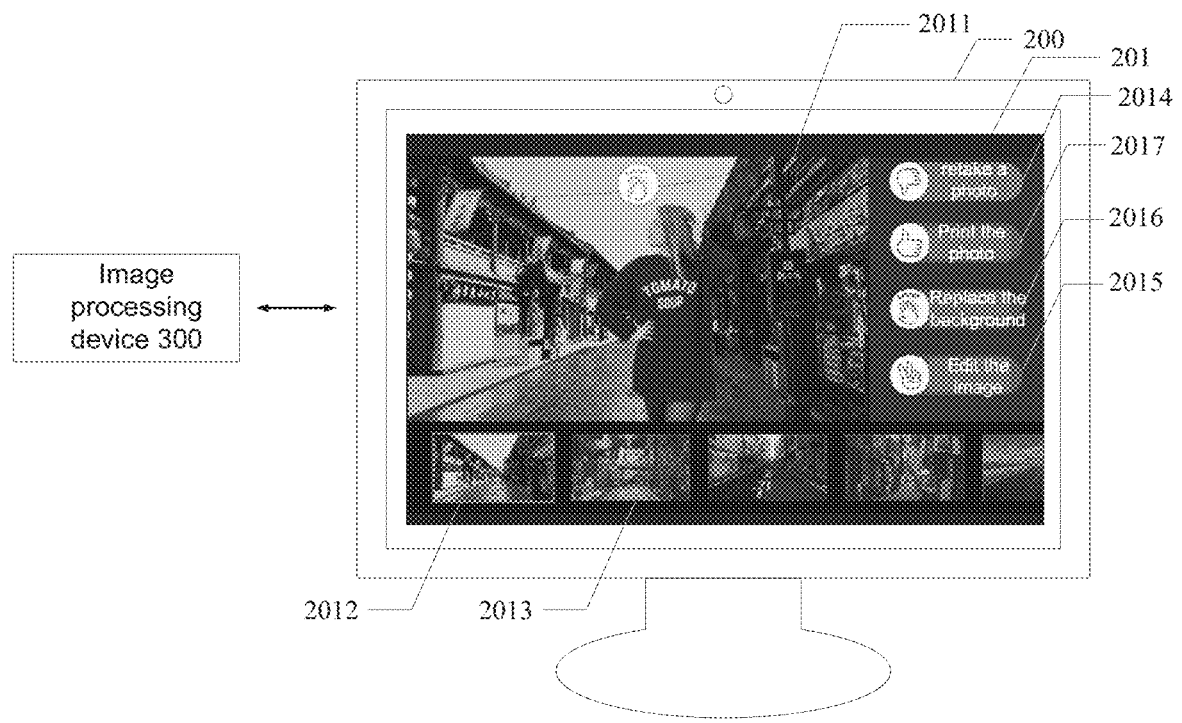
FIG. 10 is yet another process diagram of an image processing method, in accordance with some embodiments.

As shown in FIG. 10, the display device 200 displays the first interface 201. The first interface 201 includes a fused image 2011, a current background image 2012 and alternative background images 2013. Compared with an alternative background image 2013, a frame of the current background image 2012 is highlighted. Optionally, the current background image 2012 may also be displayed with a bold frame, or may be slightly larger than the alternative background image 2013.

Referring to FIG. 10, the first interface 201 further displays a second prompt 2014: "'give a dislike' to retake a photo", the image processing device 300 recognizes a "give a dislike" gesture of thumb-down made by the user with one hand according to a real-time image acquired by the image acquisition device to determine that the user has input the second instruction, and the display device 200 displays the second interface 202 (i.e., the photographing interface) in response to the second instruction. Optionally, in a case where the second interface is the album interface, the second prompt 2014 may be replaced with "'give a dislike' to re-select a picture", and the display device 200 displays the album interface in response to the user's second instruction.

Figure 11:
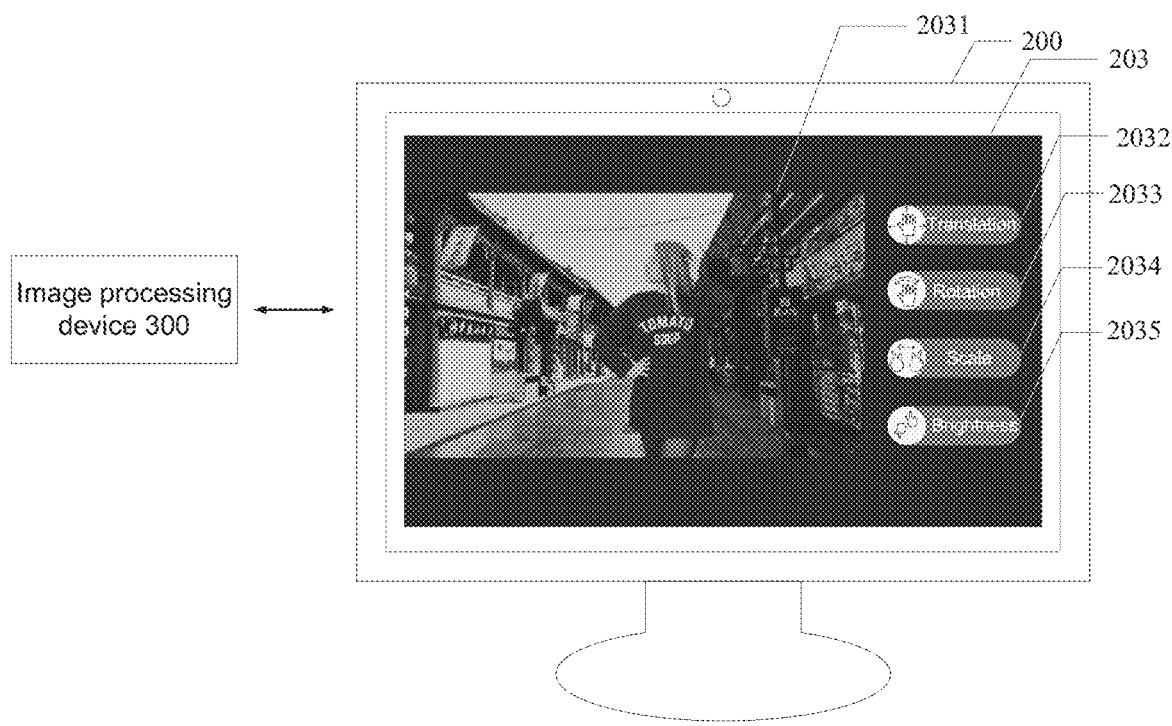
FIG. 11 is yet another process diagram of an image processing method, in accordance with some embodiments.

Referring to FIG. 10, the first interface 201 further displays a third prompt 2015: "'make a scissor hand' to edit the image", the image processing device 300 recognizes a "scissor hand" gesture with the index finger and the middle finger up made by the user with one hand according to the real-time image acquired by the image acquisition device to determine that the user has input the third instruction, and the display device 200 displays a third interface 203 in response to the third instruction. Referring to FIG. 11, the third interface 203 displays a fused image 2031, a translation editing prompt 2032, a rotation editing prompt 2033, a scaling editing prompt 2034, and a brightness adjustment prompt 2035.

Referring to FIG. 10, the first interface 201 further displays a fourth prompt 2016: "'wave hand' to replace the background", the image processing device 300 recognizes a "wave-hand" gesture with five fingers open and wave left or right made by the user with one hand according to the real-time image acquired by the image acquisition device to determine that the user has input the fourth instruction. The image processing device 300 replaces the background image of the fused image in response to the fourth instruction, and the display device 200 displays a new fused image, and displays the currently selected background image with a highlighted frame. Optionally, if the user raises his palm towards the image acquisition device and waves his hand to left, the background image is replaced with a background image on the right side of the current background image, and if the user raises his palm towards the image acquisition device and waves his hand to right, the background image is replaced with a background image on the left side of the current background image.

Figure 12:
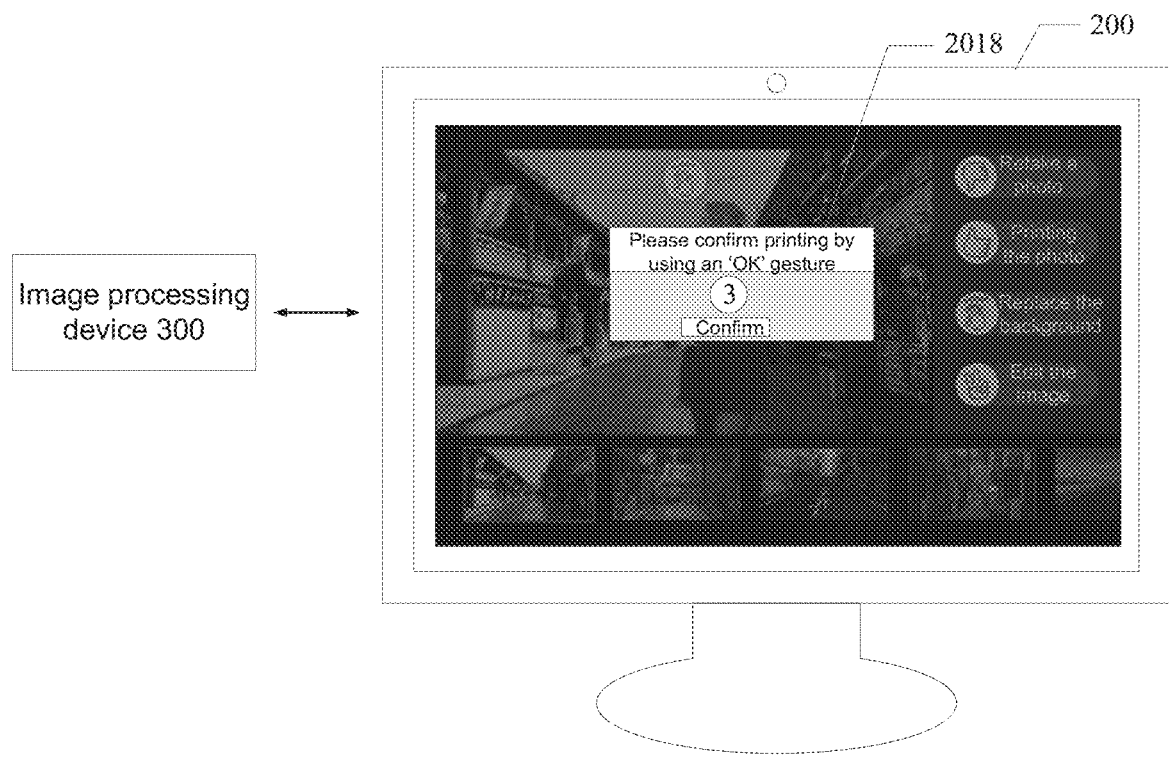
FIG. 12 is yet another process diagram of an image processing method, in accordance with some embodiments.

Referring to FIG. 10, the first interface 201 further displays a fifth prompt 2017: "'give a like' to print the photo", the image processing device 300 recognizes a "give a like" gesture of thumb-up made by the user with one hand according to a real-time image acquired by the image acquisition device to determine that the user has input the fifth instruction, and the display device 200 displays a pop-up window 2018 shown in FIG. 12 in response to the fifth instruction. Referring to FIG. 12, the pop-up window 2018 displays a prompt "please confirm printing by using an 'OK' gesture", and displays a countdown. If the image processing device 300 detects that the user makes the OK gesture with one hand before the countdown ends, the image processing device 300 outputs the fused image to a printing device. If the user's OK gesture is not detected before the countdown ends, the display device 200 no longer displays the pop-up window 2018 and returns to the first interface 201 that displays normally. Countdown duration may be set to be, for example, 10 seconds, 20 seconds.

Therefore, in the embodiments of the present disclosure, if the user is not satisfied with the fused image generated by default, the user may return and re-select or retake a first image, or replace the background image of the fused image, or perform an image processing operation based on the fused image. If the user is satisfied with the current fused image, the fused image may be saved or printed directly. In this way, the user may obtain a satisfactory fused image through a simple interaction with the device, thereby improving user's experience.

In some embodiments, the image processing method further includes: acquiring computing resource information of a computing device for performing the image processing method; and adjusting image processing resolution of the image processing model according to the computing resource information.

Examples, in S20, of selecting an appropriate image processing model according to the type of the first image and selecting an appropriate image processing model according to the resolution of the first image are provided. It can be understood that, an appropriate image processing model may also be selected or adjusted according to the computing resource information and application scenarios where the image processing device is deployed.

For example, the computing resource information of the image processing device is obtained by means such as system interface reading, searching and matching according to a device model, and the resolution of the image processing model is adjusted through an up-sampling operation or a down-sampling operation according to the computing resource information. In this way, a good balance may be obtained between computing speed and processing effect, and an optimal effect may be achieved in limited computing resources of the device used.

Therefore, in the image processing method provided by the embodiments of the present disclosure, the first image that needs to perform portrait segmentation to replace the background is directly input into the image processing model to identify the region of the person figure in the image, then the first image and the background image are fused according to the region of the person figure, and the fused image is displayed. In this case, the user inputs a photo of a person, and directly obtains a result of background replacement by portrait segmentation, so as to realize an end-to-end background replacement by portrait segmentation without redundant operations by the user, thereby improving image processing efficiency and user's experience.

The following is an exemplary description of a training process of the image processing model used in the image processing method by considering an example in which the target object is the person figure and the image processing model is a trained salient object detection model.

The embodiments of the present disclosure provide a training method of an image processing model. For example, the training method of the image processing model may be applied to the image processing system and the training device of the image processing model. As shown in FIG. 13, the training method of the image processing mode includes the following steps (S50 to S70).

In S50, a portrait with simple background, an image with complex background and a portrait with complex background are input into a pre-trained image processing model.

Figure 14:
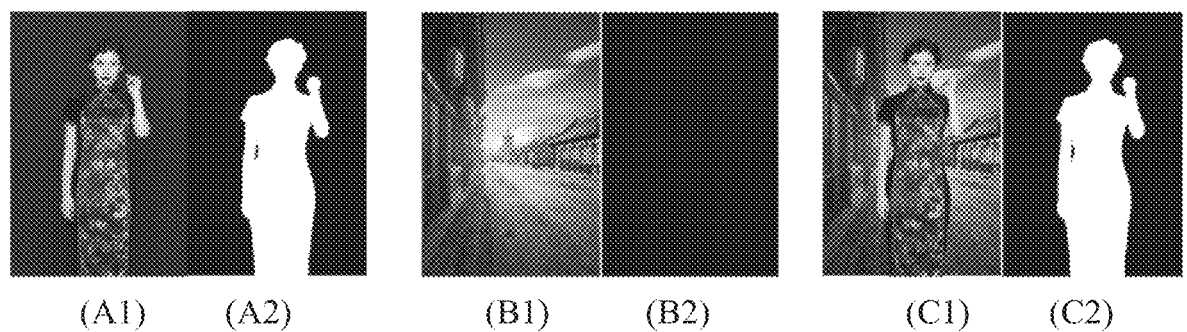
FIG. 14 is a structural diagram of a training sample set, in accordance with some embodiments.

For example, the portrait with simple background is, as shown in the portion (A1) of FIG. 14, a photo of a person with a clean and concise background. For example, there are not too many buildings, animals and plants, or other objects around the person, background elements are relatively simple and concise, and there are few interfering objects. For example, the background of the portrait with simple background is a near-pure color background. For another example, the background of the portrait with simple background is blurred, wherein a large aperture is used when photographing, and the background becomes a blurred color.

For example, the image with complex background is a photo without a person and with a complex background. As shown in the portion (B1) of FIG. 14, the image with complex background may include various types of background such as indoor scenes, urban scenes, and natural scenery. The portrait with complex background is, as shown in the portion (C1) of FIG. 14, a photo of a person with a complex background.

For example, the pre-trained image processing model includes a salient object detection model. For example, the pre-trained image processing model is a $U^2$-Net model.

It will be understood that, the portrait with simple background is input into the salient object detection model, and the person figure is a visually salient region in the image. Therefore, the region of the person figure in the portrait with simple background may be identified by using the salient object detection model. However, some salient object detection models do not have a good recognition effect in portrait segmentation. For example, when the portrait with complex background is detected, buildings in the background may also be recognized as a salient object. Therefore, it is necessary to train the salient object detection model using a portrait segmentation training sample set, so that a segmentation ability is transferred from "foreground-background" recognition to "portrait-background" recognition, and the training of the portrait segmentation model is completed quickly.

The portrait with complex background is used to improve portrait segmentation ability of the image processing model, the portrait with simple background is used to reduce training time, and the image with complex background is used as a negative sample to improve recognition ability of the pre-trained image processing model for the person figure.

For example, FIG. 14 shows examples of corresponding relationships between input images and truth-value images in the training sample set. A truth-value image of the portrait with simple background may refer to the portion (A2) in FIG. 14, a truth-value image of the image with complex background may refer to the portion (B2) in FIG. 14, and a truth-value image of the portrait with complex background may refer to the portion (C2) in FIG. 14.

It can be understood that, the truth-value image of the portrait with simple background and the truth-value image of the portrait with complex background are each a mask image of a person figure in the image, while the image with complex background does not include a person figure, so the truth-value image of the image with complex background is the all-zero image.

In order to realize the training of the portrait segmentation model, a large amount of portrait segmentation data as shown in FIG. 14 are required. However, the portrait segmentation data set currently acquired are mostly half-length portraits, segmentation precision is low and a segmentation border is rough, and it is difficult to cope with tasks such as portrait segmentation with high-definition and full-length portrait segmentation. In addition, manual labeling of the portrait segmentation data has a large workload and needs to use professional software for fine processing, which causes low labeling efficiency and high cost.

In some embodiments, a mask image of the portrait with simple background includes a saliency probability map output by the salient object detection model after the portrait with simple background is input into the salient object detection model.

In some embodiments, the pre-trained image processing model is a first $U^2$-Net model. The mask image of the portrait with simple background is the saliency probability map output by a second $U^2$-Net model after the portrait with simple background is processed by using the second $U^2$-Net model.

In some embodiments, the portrait with complex background is a composite image of the portrait with simple background and the image with complex background.

For example, before the portrait with simple background, the image with complex background and the portrait with complex background are input into the pre-trained image processing model, the training method of the image processing model further includes: fusing the portrait with simple background and the image with complex background according to the mask image of the portrait with simple background, so as to obtain a fused image; and perform augmenting processing on the fused image to obtain the portrait with complex background.

The following is an exemplary description of an acquisition process of the training sample set used in training method of the image processing model in detail by considering an example in which a target object is a person figure, the pre-trained image processing model is the first U-Net model, and the mask image of the portrait with simple background is the saliency probability map output by the second U-Net model after the portrait with simple background is processed by using the second $U^2$-Net model.

Figure 15:
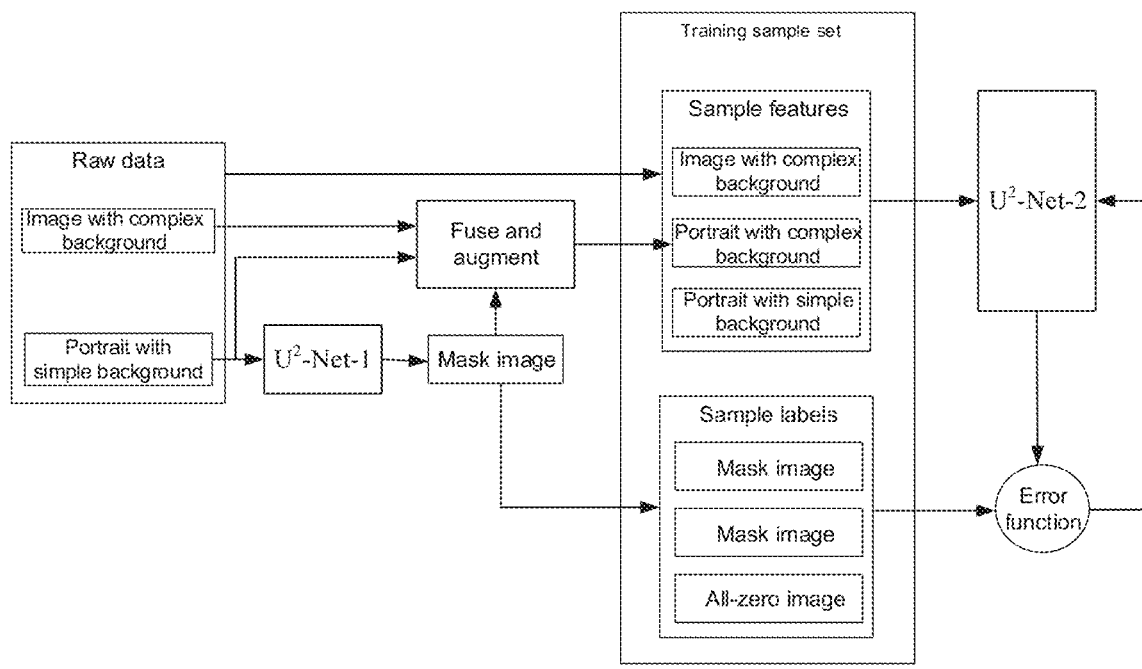
FIG. 15 is a logic diagram of a training method of an image processing model, in accordance with some embodiments.
Figure 16:
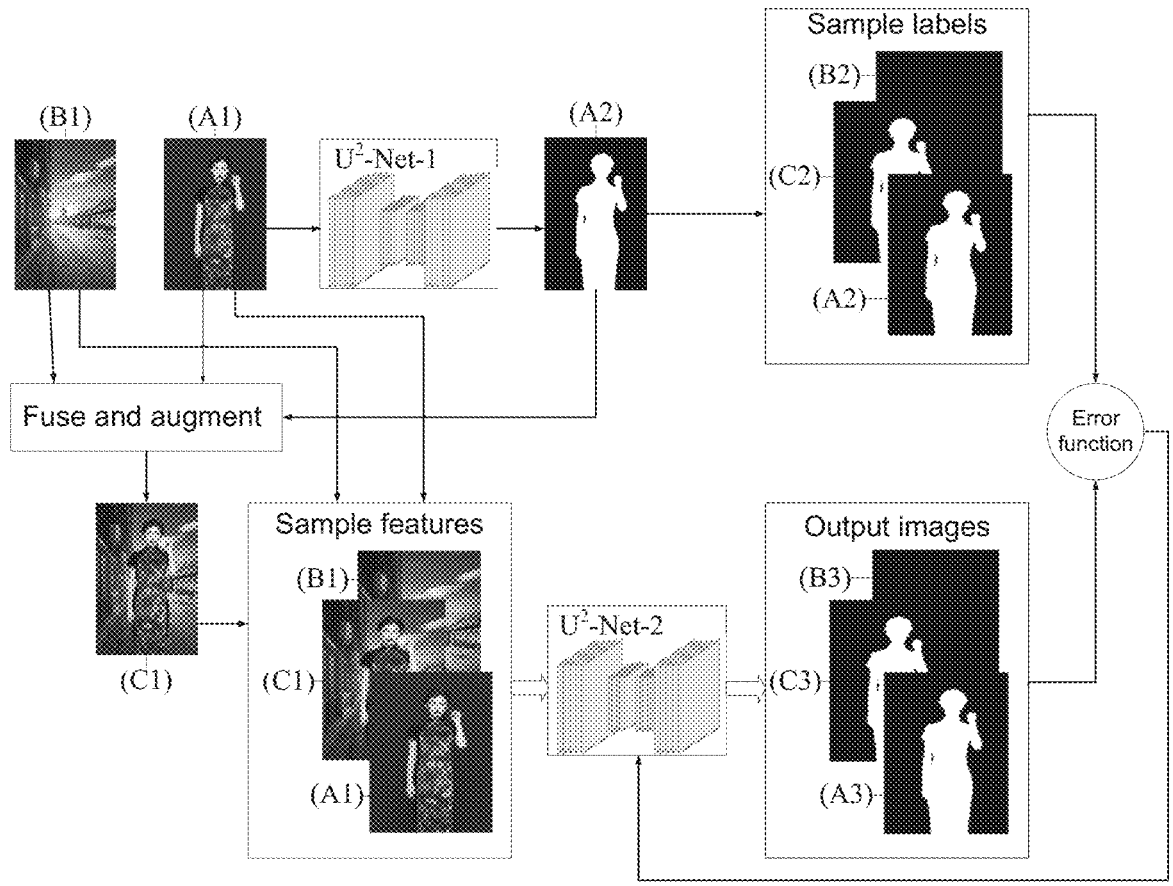
FIG. 16 is an effect diagram of a training method of an image processing model, in accordance with some embodiments.

Referring to FIGS. 15 and 16, FIG. 15 shows a logic diagram of the training method of the image processing model provided by the embodiments of the present disclosure, and FIG. 16 shows an effect diagram of the training method of the image processing model provided by the embodiments of the present disclosure.

As shown in FIG. 15, in the embodiments of the present disclosure, raw data are the portrait with simple background and the image with complex background. For example, the portrait with simple background may be obtained by filtering from a common data set, capture a screen image from a movie and television play, or taking a photo in a simple background. The image with complex background may be obtained by screening an image with high-resolution from images that are from the Internet.

For example, generating the training sample set according to the raw data may include the following steps 1) to 4). The portrait with simple background may refer to the portion (A1) in FIG. 16, and the image with complex background may refer to the portion (B1) in FIG. 16.

1) Portraits with simple background (A1) in the raw data are input into $U^2$-Net-1, and mask images (A2) of the portraits with simple background are obtained.

2) The mask images (A2) of the portraits with simple background are screened, and some mask images, each of which has a complete and clear label of an overall outline of a person figure and is not omitted or is mislabeled, and some portraits with simple background corresponding to the some mask images are obtained through screening.

3) The some portraits with simple background (A1) and images with complex background (B1) in the raw data are fused and augmented according to the some mask images (A2) screened in the step 2), so as to obtain portraits with complex background (C1).

For example, a portrait with simple background (A1) and an image with complex background (B1) are fused firstly according to a mask image (A2) to obtain a fused image, and then one or more image processing functions are randomly selected to perform augmentation processing on the fused image, so as to obtain at least one portrait with complex background (C1).

It will be noted that, an implementation manner of fusing the portrait with simple background and the image with complex background here may refer to the description of the implementation manner of fusing the first image and the background image in S30, and details will not be repeated here.

It can be understood that, one portrait with simple background may be randomly fused with a plurality of images with complex background. Similarly, one image with complex background may be randomly fused with a plurality of portraits with simple background. Therefore, a plurality of fused images may be obtained, so as to greatly improve an amount of training samples.

In some embodiments, the portrait with complex background (C1), the portrait with simple background (A1), and the image with complex background (B1) satisfy a following relationship:

$$I_{fusion}' = T_{random1}[T_{random2} \times I_{person}' \times I_{mask}' + T_{random3} \times I_{background}' \times (1 - I_{mask}')].$$

Where $I_{fusion}'$ represents the portrait with complex background, $I_{person}'$ represents the portrait with simple background, $I_{background}'$ represents the image with complex background, $I_{mask}'$ represents the mask image of the portrait with simple background, a value of each element of $I_{mask}'$ is in a range of 0 to 1, inclusive ([0, 1]), and $T_{random1}$, $T_{random2}$ and $T_{random3}$ each represent a random image processing function.

For example, the random image processing function includes one or more of an image exposure adjustment function, an image contrast adjustment function, an image saturation adjustment function, an image sharpness adjustment function, an image scaling function, an image rotation function, or an image translation function.

$T_{random1}$ reflects an image fusion operation performed on a whole fused image in step 3) and an augmentation processing operation performed on the whole fused image in step 3). $T_{random2}$ reflects an image fusion operation separately performed on the portrait with simple background in step 3) and an augmentation processing operation separately performed on the portrait with simple background in step 3). $T_{random3}$ reflects an image fusion operation separately performed on the image with complex background in step 3) and an augmentation processing operation separately performed on the image with complex background in step 3).

4) The some portraits with simple background (A1) and the corresponding mask images (A2) screened out in step 2), the portraits with complex background (C1) and corresponding mask images (C2) generated in step 3), and the images with complex background (B1) in the raw data and all-zero images (B2) corresponding to the images with complex background constitute a complete training sample set.

As shown in FIG. 14, the truth-value image of the portrait with simple background and the truth-value image of the portrait with complex background are both the mask image of the portrait with simple background, and the truth-value image of the image with complex background is the all-zero image. In other words, as shown in FIGS. 15 and 16, in the training sample set, sample features include the portrait with simple background, the image with complex background and the portrait with complex background, a sample label of the portrait with simple background and a sample label of the portrait with complex background are both the mask image of the portrait with simple background, and a sample label of the image with complex background is the all-zero image.

It can be understood that, sample labels of portraits with complex background composited from the same portrait with simple background each include the mask image of the portrait with simple background, and the mask image may be adjusted to an appropriate size and position according to a compositing process. For example, a size of the image with complex background is 1080×1920, a size of the portrait with simple background is 1920×1080, the size of the portrait with simple background is reduced to 1080×607.5 during the compositing process, and a left side of the portrait with simple background is aligned with a left side of the image with complex background, that is, the person figure is located on the left side of the portrait with complex background. As a result, a size of the sample label (the truth-value image) of the portrait with complex background is 1060×1920, a region of 10680×607.5 on the left side corresponds to a mask image of the reduced portrait with simple background, and a region of 1080×1312.5 on the right side is all-zero.

Therefore, in the embodiments of the present disclosure, the portrait with complex background in the training sample set is the composite image of the portrait with simple background and the image with complex background. Moreover, in the training sample set, the sample label of the portrait with simple background and the sample label of the portrait with complex background are both the mask image of the portrait with simple background, the sample label of the image with complex background is the all-zero image, and the mask image of the portrait with simple background is the salient objection detection result of the portrait with simple background. In this way, the raw data are portraits with simple background and the images with complex background, and the photo of the portrait with simple background is segmented by the salient object detection algorithm, so that the precise and accurate portrait segmentation result, as the data label of the training sample set, may be obtained quickly. Thus, the labor cost and time cost of manual labeling may be avoided, which is simple and efficient. Portrait foregrounds obtained by segmentation and the images with complex background are fused randomly, and data augmentation are performed thereon in combination with traditional image processing methods, so that a large number of portraits with complex background and labeled data pairs are obtained, which may quickly complete an acquisition of a required training sample set, and ensure quality and quantity.

In S60, an error function of the pre-trained image processing model is determined.

The truth-value image of the portrait with simple background and the truth-value image of the portrait with complex background are both the mask image of the portrait with simple background, and the truth-value image of the image with complex background is the all-zero image.

In some embodiments, determining the error function of the pre-trained image processing model includes: comparing an output image of the pre-trained image processing model with a corresponding truth-value image to obtain the error function.

As shown in FIGS. 15 and 16, the sample features (i.e., the portrait with simple background (A1), the image with complex background (B1) and the portrait with complex background (C1)) in the training sample set are all input into $U^2$-Net-2, so as to obtain output images (A3), (B3), (C3) respectively. The output image (A3) is compared with the sample label (A2) in the training sample set, the output image (B3) is compared with the sample label (B2) in the training sample set, and the output image (C3) is compared with the sample label (C2) in the training sample set, so as to obtain the error function.

For example, the error function is a cross-entropy loss function of model output and a true value. In the embodiments of the present disclosure, a network model is trained by using the cross-entropy loss function, and a calculation formula of the cross-entropy loss is as follows:

$$L(y, \hat{y}) = \frac{1}{N}\sum_{n=1}^{N}\sum_{(r,c)}^{(H,W)}\left[y_{n(r,c)}\log\hat{y}_{n(r,c)} + \left(1 - \hat{y}_{n(r,c)}\right)\times\log(1 - y_{n(r,c)})\right].$$

Where N is the number of input images in a batch, (r, c) is a coordinate of a pixel, (H, W) is a size of an image and represents height and width, respectively, y is an output image of the pre-trained image processing model, and $\hat{y}$ is a corresponding truth-value image. For example, a value of N indicates a sample number used in a single training, for example, N takes 32.

In S70, the pre-trained image processing model is trained according to the error function, so as to obtain the image processing model.

For example, the $U^2$-Net-2 is trained by using the error function, parameters of the pre-trained image processing model are adjusted during the training process, so that the error function is lower than a preset error threshold, so as to obtain the image processing model.

Therefore, in the training method of the image processing model provided by the embodiments of the present disclosure, the portrait with simple background, the image with complex background and the portrait with complex background are input into the pre-trained image processing model, and the pre-trained image processing model is trained according to the error function of the pre-trained image processing model, so as to obtain the image processing model. In this case, the pre-trained image processing model is trained using the portrait segmentation training sample set, so that the segmentation ability is transferred from "foreground-background" recognition to "portrait-background" recognition, and the training of the portrait segmentation model is completed quickly.

Moreover, in the embodiments of the present disclosure, the image processing model is a salient object detection model trained in advance, sample features of the training sample set include the portraits with simple background, the images with complex background and the portraits with complex background. The training sample set is used to train the salient object detection model, so that the error function is less than the preset error threshold, and the image processing model is obtained. In this way, considering that the task of the salient object detection is to detect and label visually salient objects in images, while the portrait segmentation is to limit categories of salient objects to a range of person(s) based on the task of the salient object detection. Therefore, referring to the features of transfer learning, network parameters are initialized by using a pre-trained image processing model of the salient object detection algorithm (e.g. U²Net), so that the network starts to optimize the parameters at a good node, which may realize a rapid convergence of the loss function, thereby reducing training time and enhancing stability of the network training.

Figure 17:
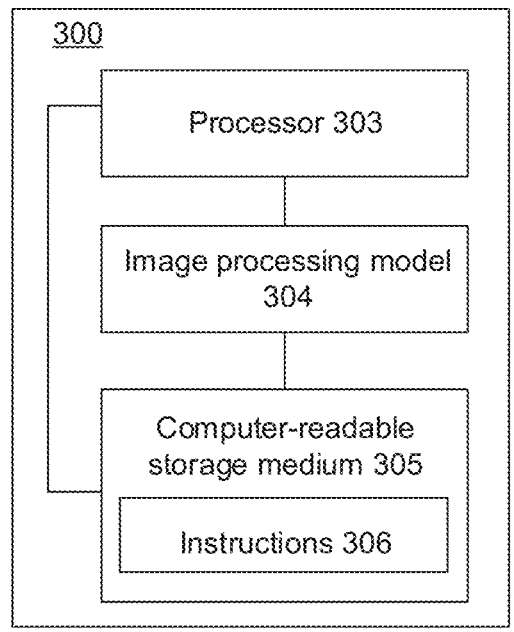
FIG. 17 is a structural diagram of another image processing device, in accordance with some embodiments.

The embodiments of the present disclosure provide an image processing device. The image processing device may implement the image processing method in any of the above embodiments. As shown in FIG. 17, the image processing device 300 includes at least one processor 303, an image processing model 304, and at least one non-transitory computer-readable storage medium 305 including instructions 306. The instructions 306, when executed by the at least one processor 303, cause the at least one processor 303 to perform operations. The operations include: acquiring a first image containing a target object; inputting the first image into the image processing model 304 to obtain a second image, the second image being a mask image of the target object in the first image, a value for each pixel in the second image being in a range of 0 to 1, inclusive (i.e., [0, 1]), and the range of 0 to 1, inclusive ([0, 1]) indicating a degree of relation between each pixel in the second image and a pixel in the target object; fusing the first image and a background image according to the second image to obtain a fused image; and providing a first interface and display the fused image on the first interface.

For example, acquiring the first image containing the target object includes: providing a second interface displaying a user input indication: receiving a first instruction input by the user; acquiring the first image containing the target object in response to the first instruction.

For example, after the fused image is displayed on the first interface, the operations further include: receiving a second instruction input by the user; and displaying a second interface in response to the second instruction.

For example, after the fused image is displayed on the first interface, the operations further include: receiving a third instruction input by the user; and editing the fused image displayed on the first interface using one or more image editing manners in response to the third instruction.

For example, the fused image, the first image, the second image, and the background image satisfy a following relationship:

$$I_{fusion}=T_{fusion1}[T_{fusion2} \times I_{person} \times I_{mask} + T_{fusion3} \times I_{background} \times (1-I_{mask})].$$

Where $I_{fusion}$ represents the fused image, $I_{person}$ represents the first image, $I_{background}$ represents the background image, $I_{mask}$ represents the second image, a value of each element of $I_{mask}$ is in a range of 0 to 1, inclusive ([0, 1]), and $T_{fusion1}$, $T_{fusion2}$ and $T_{fusion3}$ each represent an image processing function.

For example, the operations further include: acquiring computing resource information of a computing device for performing the image processing method; and adjusting image processing resolution of the image processing model 304 according to the computing resource information.

For example, the target object is a person figure, the image processing model 304 is an image processing model trained by adopting the following steps: inputting a portrait with simple background, an image with complex background and a portrait with complex background into a pre-trained image processing model; determining an error function of the pre-trained image processing model; and training the pre-trained image processing model according to the error function, so as to obtain the image processing model. A truth-value image of the portrait with simple background and a truth-value image of the portrait with complex background are both a mask image of the portrait with simple background, and a truth-value image of the image with complex background is an all-zero image.

For example, the portrait with complex background is a composite image of the portrait with simple background and the image with complex background. Before the portrait with simple background, the image with complex background and the portrait with complex background are input into the pre-trained image processing model, the following steps are further included: fusing the portrait with simple background and the image with complex background according to the mask image of the portrait with simple background to obtain a fused image; and performing augmentation processing on the fused image to obtain the portrait with complex background.

For example, the portrait with complex background, the portrait with simple background, and the image with complex background satisfy a following relationship:

$$I_{fusion}'=T_{random1}[T_{random2} \times I_{person}' \times I_{mask}' + T_{random3} \times I_{background}' \times (1-I_{mask}')].$$

Where $I_{fusion}'$ represents the portrait with complex background, $I_{person}'$ represents the portrait with simple background, $I_{background}'$ represents the image with complex background, $I_{mask}'$ represents the mask image of the portrait with simple background, a value of each element of $I_{mask}'$ is in a range of 0 to 1, inclusive ([0, 1]), and $T_{random1}$, $T_{random2}$ and $T_{random3}$ each represent a random image processing function.

For example, the pre-trained image processing model includes a salient object detection model. The mask image of the portrait with simple background includes a saliency probability map output by the salient object detection model after the portrait with simple background is input into the salient object detection model.

For example, the pre-trained image processing model is a first U²-Net model. The mask image of the portrait with simple background is a saliency probability map output by a second U²-Net model after the portrait with simple background is processed by using the second U²-Net model.

For example, determining the error function of the pre-trained image processing model includes: comparing an output image of the pre-trained image processing model with a corresponding truth-value image to obtain the error function.

For example, the processor 303 may be a processor, or a collective name of a plurality of processing elements. For example, the processor 303 may be a general-purpose central processing unit (CPU), a microprocessor, an application specific integrated circuit (ASIC), or one or more integrated circuits used for controlling the execution of programs of the solutions of the present disclosure, such as one or more microprocessors. For another example, the processor 303 may be a programmable device, such as a complex programmable logic device (CPLD), an erasable programmable logic device (EPLD) or a field programmable gate array (FPGA).

For example, the computer-readable storage medium 305 may include but is not limited to, a magnetic storage device (e.g., a hard disc, a floppy disk or a magnetic tape), an optical disc (e.g., a compact disk (CD), a digital versatile disk (DVD)), a smart card, a flash memory device (e.g., an erasable programmable read-only memory (EPROM), a card, a stick or a key driver). Various computer-readable storage media described in the embodiments of the present disclosure may represent one or more devices and/or other machine-readable storage media, which are used for storing information. The term "machine-readable storage media" may include, but is not limited to, wireless channels and various other media capable of storing, containing and/or carrying instructions and/or data.

For more details of the image processing device performing the above operations, reference may be made to the descriptions of corresponding method embodiments above, which will not be repeated here.

The above embodiments may be implemented in whole or in part through software, hardware, firmware, or any combination thereof. When the above embodiments are implemented by using a software program, the software program may be implemented in a form of a computer program product in whole or in part. The computer program product includes one or more computer instructions. When the computer instructions are loaded and executed by a computer, the processes or functions according to the embodiments of the present application are generated in whole or in part. The computer may be a general-purpose computer, a special-purpose computer, a computer network, or any other programmable device. The computer instructions may be stored in a computer-readable storage medium. The computer-readable storage medium may be any available medium that may be accessed by a computer, or a data storage device such as a server including one or more available media or a data center including one or more available media. The available medium may be a magnetic medium (e.g., a floppy disk, a magnetic disc or a magnetic tape), an optical medium (e.g., a digital versatile disc (DVD)), or a semiconductor medium (e.g., a solid state drive (SSD)), etc.

It will be noted that, beneficial effects of the image processing device as described above are the same as the beneficial effects of the image processing method as described in the above embodiments, and will not be repeated here.

Figure 18:
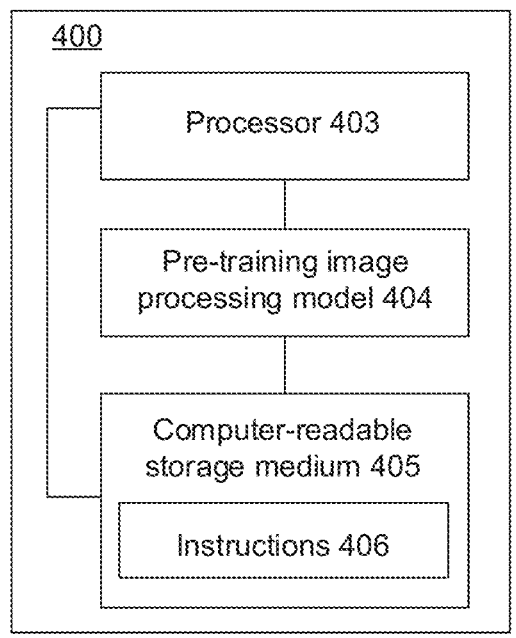
FIG. 18 is a structural diagram of another training device of an image processing model, in accordance with some embodiments.

The embodiments of the present disclosure provide a training device of an image processing model. The training device of the image processing model may implement the training method of the image processing model in any of the above embodiments. As shown in FIG. 18, the training device 400 of the image processing model includes at least one processor 403, a pre-trained image processing model 404, and at least one non-transitory computer-readable storage medium 405 including instructions 406. The instructions 406, when executed by the at least one processor 403, cause the at least one processor 403 to perform operations. The operations include: inputting a portrait with simple background, an image with complex background and a portrait with complex background into the pre-trained image processing model; determining an error function of the pre-trained image processing model; and training the pre-trained image processing model according to the error function, so as to obtain the image processing model. A truth-value image of the portrait with simple background and a truth-value image of the portrait with complex background are both a mask image of the portrait with simple background, and a truth-value image of the image with complex background is an all-zero image.

For example, the portrait with complex background is a composite image of the portrait with simple background and the image with complex background. Before the portrait with simple background, the image with complex background and the portrait with complex background are input into the pre-trained image processing model, the training method further includes: fusing the portrait with simple background and the image with complex background according to the mask image of the portrait with simple background to obtain a fused image; and performing augmentation processing on the fused image to obtain the portrait with complex background.

For example, the portrait with complex background, the portrait with simple background, and the image with complex background satisfy a following relationship:

$$I_{fusion}' = T_{random1}[T_{random2} \times I_{person}' \times I_{mask}' + T_{random3} \times I_{background}' \times (1 - I_{mask}')].$$

Where $I_{fusion}'$ represents the portrait with complex background, $I_{person}'$ represents the portrait with simple background, $I_{background}'$ represents the image with complex background, $I_{mask}'$ represents the mask image of the portrait with simple background, a value of each element of $I_{mask}'$ is in a range of 0 to 1, inclusive ([0, 1]), and $T_{random1}$, $T_{random2}$ and $T_{random3}$ each represent a random image processing function.

For example, the pre-trained image processing model 404 includes a salient object detection model. The mask image of the portrait with simple background includes a saliency probability map output by the salient object detection model after the portrait with simple background is input into the salient object detection model.

For example, the pre-trained image processing model is a first $U^2$-Net model. The mask image of the portrait with simple background is a saliency probability map output by a second $U^2$-Net model after the portrait with simple background is processed by using the second $U^2$-Net model.

For example, determining the error function of the pre-trained image processing model includes: comparing an output image of the pre-trained image processing model with a corresponding truth-value image to obtain the error function.

For example, the processor 403 may be a processor, or a collective name of a plurality of processing elements. For example, the processor 403 may be a general-purpose central processing unit (CPU), a microprocessor, an application specific integrated circuit (ASIC), or one or more integrated circuits used for controlling the execution of programs of the solutions of the present disclosure, such as one or more microprocessors. For another example, the processor 403 may be a programmable device, such as a complex programmable logic device (CPLD), an erasable programmable logic device (EPLD) or a field programmable gate array (FPGA).

For example, the computer-readable storage medium 405 may include but is not limited to, a magnetic storage device (e.g., a hard disc, a floppy disk or a magnetic tape), an optical disc (e.g., a compact disk (CD), a digital versatile disk (DVD)), a smart card, a flash memory device (e.g., an erasable programmable read-only memory (EPROM), a card, a stick or a key driver). Various computer-readable storage media described in the embodiments of the present disclosure may represent one or more devices and/or other machine-readable storage media, which are used for storing information. The term "machine-readable storage media" may include, but is not limited to, wireless channels and various other media capable of storing, containing and/or carrying instructions and/or data.

For more details of the training device of the image processing model performing the above operations, reference may be made to the descriptions of corresponding method embodiments above, which will not be repeated here.

The above embodiments may be implemented in whole or in part through software, hardware, firmware, or any combination thereof. When the above embodiments are implemented by using a software program, the software program may be implemented in a form of a computer program product in whole or in part. The computer program product includes one or more computer instructions. When the computer instructions are loaded and executed by a computer, the processes or functions according to the embodiments of the present application are generated in whole or in part. The computer may be a general-purpose computer, a special-purpose computer, a computer network, or any other programmable device. The computer instructions may be stored in a computer-readable storage medium. The computer-readable storage medium may be any available medium that may be accessed by a computer, or a data storage device such as a server including one or more available media or a data center including one or more available media. The available medium may be a magnetic medium (e.g., a floppy disk, a magnetic disc or a magnetic tape), an optical medium (e.g., a digital versatile disc (DVD)), or a semiconductor medium (e.g., a solid state drive (SSD)), etc.

It will be noted that, beneficial effects of the training device of the image processing model as described above are the same as the beneficial effects of the training method of the image processing model as described in the above embodiments, and will not be repeated here.

Some embodiments of the present disclosure provide a computer-readable storage medium (e.g., a non-transitory computer-readable storage medium). The computer-readable storage medium has stored thereon computer program instructions that, when run on a processor, cause the processor to perform one or more steps of the image processing method as described in any of the above embodiments or one or more steps of the training method of the image processing model as described in any of the above embodiments.

For example, the computer-readable storage medium may include, but is not limited to, a magnetic storage device (e.g., a hard disc, a floppy disk or a magnetic tape), an optical disc (e.g., a compact disk (CD), a digital versatile disk (DVD)), a smart card or a flash memory device (e.g., an erasable programmable read-only memory (EPROM), a card, a stick or a key drive). Various computer-readable storage media described in the embodiments of the present disclosure may represent one or more devices and/or other machine-readable storage media, which are used for storing information. The term "machine-readable storage media" may include, but is not limited to, wireless channels and various other media capable of storing, containing and/or carrying instructions and/or data.

Some embodiments of the present disclosure further provide a computer program product. The computer program product includes computer program instructions that, when executed by a computer, cause the computer to perform one or more steps of the image processing method as described in the above embodiments or one or more steps of the training method of the image processing model as described in the above embodiments.

Some embodiments of the present disclosure further provide a computer program. When the computer program is executed by a computer, the computer program causes the computer to perform one or more steps of the image processing method as described in the above embodiments or one or more steps of the training method of the image processing model as described in the above embodiments.

Beneficial effects of the computer-readable storage medium, the computer program product and the computer program are the same as the beneficial effects of the image processing method or the training method of the image processing model as described in some of the above embodiments, which will not be repeated herein.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. An image processing method, comprising:
acquiring a first image containing a target object;
inputting the first image into an image processing model to obtain a second image, the second image being a mask image of the target object in the first image, a value for each pixel in the second image being in a range of 0 to 1, inclusive ([0, 1]), and the range of 0 to 1, inclusive ([0, 1]) indicating a degree of relation between each pixel in the second image and a pixel in the target object;
fusing the first image and a background image according to the second image to obtain a fused image; and
providing a first interface and displaying the fused image on the first interface;
wherein the target object is a person figure, and the image processing model is an image processing model trained by using following steps:
inputting a portrait with simple background, an image with complex background and a portrait with complex background into a pre-trained image processing model;
determining an error function of the pre-trained image processing model; and
training the pre-trained image processing model according to the error function to obtain the image processing model,
wherein a truth-value image of the portrait with simple background and a truth-value image of the portrait with complex background are both a mask image of the portrait with simple background, and a truth-value image of the image with complex background is an all-zero image.

2. The image processing method according to claim 1, wherein acquiring the first image containing the target object includes:
provviding a second interface displaying a user input indication;
receiving a first instruction input by a user; and
acquiring the first image containing the target object in response to the first instruction.

3. The image processing method according to claim 2, wherein after displaying the fused image on the first interface, the image processing method further comprises:
receiving a second instruction input by the user; and
displaying the second interface in response to the second instruction.

4. The image processing method according to claim 1, wherein after displaying the fused image on the first interface, the image processing method further comprises:
receiving a third instruction input by a user; and
editing the fused image displayed on the first interface by using one or more image editing manners in response to the third instruction.

5. The image processing method according to claim 1, wherein the fused image, the first image, the second image, and the background image satisfy a following relationship:

$$I_{fusion} = T_{fusion1}[T_{fusion2} \times I_{person} \times I_{mask} + T_{fusion3} \times I_{background} \times (1 - I_{mask})],$$

wherein $I_{fusion}$ represents the fused image, $I_{person}$ represents the first image, $I_{background}$ represents the background image, $I_{mask}$ represents the second image, a value of each element of $I_{mask}$ is in a range of 0 to 1, inclusive ([0, 1]), and $T_{fusion1}$, $T_{fusion2}$ and $T_{fusion3}$ each represent an image processing function.

6. The image processing method according to claim 1, further comprising:
acquiring computing resource information of a computing device for performing the image processing method; and
adjusting image processing resolution of the image processing model according to the computing resource information.

7. The image processing method according to claim 1, wherein the portrait with complex background is a composite image of the portrait with simple background and the image with complex background;
before inputting the portrait with simple background, the image with complex background and the portrait with complex background into the pre-trained image processing model, the following steps used to train the image processing model further includes:
fusing the portrait with simple background and the image with complex background according to the mask image of the portrait with simple background to obtain another fused image; and
performing augmentation processing on the another fused image to obtain the portrait with complex background.

8. The image processing method according to claim 1, wherein the portrait with complex background, the portrait with simple background, and the image with complex background satisfy a following relationship:

$$I_{fusion}' = T_{random1}[T_{random2} \times I_{person}' \times I_{mask}' + T_{random3} \times I_{background}' \times (1 - I_{mask}')],$$

wherein $I_{fusion}'$ represents the portrait with complex background, $I_{person}'$ represents the portrait with simple background, $I_{background}'$ represents the image with complex background, $I_{mask}'$ represents the mask image of the portrait with simple background, a value of each element of $I_{mask}'$ is in a range of 0 to 1, inclusive ([0, 1]), and $T_{random1}$, $T_{random2}$ and $T_{random3}$ each represent a random image processing function.

9. The image processing method according to claim 1, wherein the pre-trained image processing model includes a salient object detection model; and the mask image of the portrait with simple background includes a saliency probability map output by the salient object detection model after the portrait with simple background is input into the salient object detection model; or
the pre-trained image processing model is a first $U^2$-Net model, and the mask image of the portrait with simple background is a saliency probability map output by a second $U^2$-Net model after the portrait with simple background is processed by using the second $U^2$-Net model.

10. The image processing method according to claim 1, wherein determining the error function of the pre-trained image processing model includes:
comparing an output image of the pre-trained image processing model with a corresponding truth-value image to obtain the error function.

11. An image processing device, comprising:
a memory having stored thereon one or more computer programs, and
a processor coupled to the memory, and configured to execute the one or more computer program to implement the image processing method according to claim 1.

12. A non-transitory computer-readable storage medium having stored computer program instructions thereon, wherein the computer program instructions, when run on a computer, cause the computer to implement the image processing method according to claim 1.

13. A training method of an image processing model, comprising:
inputting a portrait with simple background, an image with complex background and a portrait with complex background into a pre-trained image processing model;
determining an error function of the pre-trained image processing model; and
training the pre-trained image processing model according to the error function to obtain the image processing model,
wherein a truth-value image of the portrait with simple background and a truth-value image of the portrait with complex background are both a mask image of the portrait with simple background, and a truth-value image of the image with complex background is an all-zero image.

14. The training method according to claim 13, wherein the portrait with complex background is a composite image of the portrait with simple background and the image with complex background;
before inputting the portrait with simple background, the image with complex background and the portrait with complex background into the pre-trained image processing model, the training method further comprises:
fusing the portrait with simple background and the image with complex background according to the mask image of the portrait with simple background to obtain a fused image; and
performing augmentation processing on the fused image to obtain the portrait with complex background.

15. The training method according to claim 13, wherein the portrait with complex background, the portrait with simple background, and the image with complex background satisfy a following relationship:

$$I_{fusion}'=T_{random1}[T_{random2} \times I_{person}' \times I_{mask}' + T_{random3} \times I_{background}' \times (1-I_{mask}')],$$

wherein $I_{fusion}'$ represents the portrait with complex background, $I_{person}'$ represents the portrait with simple background, $I_{background}'$ represents the image with complex background, $I_{mask}'$ represents the mask image of the portrait with simple background, a value of each element of $I_{mask}'$ is in a range of 0 to 1, inclusive ([0, 1]), and $T_{random1}$, $T_{random2}$ and $T_{random3}$ each represent a random image processing function.

16. The training method according to claim 13, wherein the pre-trained image processing model includes a salient object detection model; and the mask image of the portrait with simple background includes a saliency probability map output by the salient object detection model after the portrait with simple background is input into the salient object detection model; or the pre-trained image processing model is a first $U^2$-Net model, and the mask image of the portrait with simple background is a saliency probability map output by a second $U^2$-Net model after the portrait with simple background is processed by using the second $U^2$-Net model.

17. The training method according to claim 13, wherein determining the error function of the pre-trained image processing model includes: comparing an output image of the pre-trained image processing model with a corresponding truth-value image to obtain the error function.

18. A training device of an image processing model, comprising:

a memory having stored thereon one or more computer programs; and a processor coupled to the memory and configured to execute the one or more computer program to implement the training method of the image processing model according to claim 13.

19. A non-transitory computer-readable storage medium having stored computer program instructions thereon, wherein the computer program instructions, when run on a computer, cause the computer to implement the training method of the image processing model according to claim 13.

* * * * *